(12) United States Patent
Ohashi et al.

(10) Patent No.: US 10,802,313 B2
(45) Date of Patent: Oct. 13, 2020

(54) DISPLAY DEVICE

(71) Applicant: Sharp Kabushiki Kaisha, Sakai, Osaka (JP)

(72) Inventors: Masayuki Ohashi, Sakai (JP); Katsutoshi Kikuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/461,841

(22) PCT Filed: Dec. 8, 2017

(86) PCT No.: PCT/JP2017/044130
§ 371 (c)(1),
(2) Date: May 17, 2019

(87) PCT Pub. No.: WO2018/110443
PCT Pub. Date: Jun. 21, 2018

(65) Prior Publication Data
US 2019/0369436 A1 Dec. 5, 2019

(30) Foreign Application Priority Data
Dec. 15, 2016 (JP) .................................. 2016-243215

(51) Int. Cl.
*G02F 1/1333* (2006.01)
*G02F 1/1335* (2006.01)
*G04G 17/04* (2006.01)

(52) U.S. Cl.
CPC .. *G02F 1/133308* (2013.01); *G02F 1/133528* (2013.01); *G04G 17/045* (2013.01); *G02F 2001/13332* (2013.01); *G02F 2001/133322* (2013.01)

(58) Field of Classification Search
CPC ......... G02F 1/133308; G02F 1/133528; G02F 2001/13332; G02F 2001/133322; G04G 17/045
See application file for complete search history.

(56) References Cited

U.S. PATENT DOCUMENTS

2016/0070238 A1\* 3/2016 Dubois .................. G04C 10/02
368/84
2017/0153487 A1\* 6/2017 Kim ...................... G02B 6/0055

FOREIGN PATENT DOCUMENTS

WO 2007/108244 A1 9/2007

\* cited by examiner

*Primary Examiner* — Nathanael R Briggs
(74) *Attorney, Agent, or Firm* — Keating & Bennett, LLP

(57) ABSTRACT

A display device includes a display panel including a display area and a center non-display area, a polarizing plate on an outer surface of the display panel, a curved outer shape part included in a part of an outer shape of one of the display panel and the polarizing plate and having a curved planar shape, a linear outer shape part included in a part of the outer shape of one of or both of the display panel and the polarizing plate and having a linear planar shape, and an alignment mark included in another one or both of the polarizing plate and the display panel and disposed at a position overlapping the center non-display area and including a linear indicator part having a linear planar shape that is parallel to the linear outer shape part and a reference point part overlapping the linear indicator part.

19 Claims, 23 Drawing Sheets

DISPLAY DEVICE

TECHNICAL FIELD

The present invention relates to a display device.

BACKGROUND ART

As one example of the conventional liquid crystal display device, a liquid crystal display device described in Patent Document 1 shown below has been known. The liquid crystal display device according to this Patent Document 1 includes a liquid crystal display panel and a polarizing plate, at least one of which has an irregular planar shape other than a rectangular shape. On an orientation film, a second alignment mark is formed as an attachment mark for the attachment to the polarizing plate by aligning the mark with a first alignment mark, which is arranged on the polarizing plate as an attachment mark.

RELATED ART DOCUMENT

Patent Document

Patent Document 1: WO 2007/108244

Problem to be Solved by the Invention

In the liquid crystal display device according to Patent Document 1, two first alignment marks and two second alignment marks, which are used to attach the polarizing plate, are provided near an outer peripheral end of the liquid crystal display panel and the polarizing plate. In such a structure, when the polarizing plate with the irregular shape is aligned in a circumferential direction thereof, the first alignment marks and the second alignment marks that are farthest from the center of the polarizing plate are used, and therefore, the alignment in the circumferential direction is difficult. This results in a problem that sufficient position accuracy cannot be achieved.

DISCLOSURE OF THE PRESENT INVENTION

The present invention has been made in view of the above circumstance, and an object is to perform alignment in the circumferential direction with high position accuracy.

Means for Solving the Problem

A display device according to the present invention includes: a display panel including at least a display area where an image is displayed and a center non-display area disposed at a center of the display area; a polarizing plate disposed on an outer surface of the display panel; a curved outer shape part included in at least a part of an outer shape of at least one of the display panel and the polarizing plate and having a curved planar shape; a linear outer shape part included in at least a part of the outer shape of one of or both the display panel and the polarizing plate and having a linear planar shape; and an alignment mark included in another one or both of the polarizing plate and the display panel and disposed at a position overlapping the center non-display area and at least including a linear indicator part having a linear planar shape that is parallel to the linear outer shape part and a reference point part overlapping the linear indicator part.

In this manner, at least a part of the outer shape of at least one of the display panel and the polarizing plate includes the curved outer shape part with the planar shape that is curved. Therefore, when the polarizing plate is disposed at the outer surface of the display panel, it is difficult to align the both in a circumferential direction around the center of the display area. On the other hand, the linear outer shape part with the planar shape that is linear is provided to at least a part of the outer shape of one of or both the polarizing plate and the display panel. Therefore, a perpendicular line to this linear outer shape part is obtained first when the polarizing plate is disposed. Then, the display panel and the polarizing plate are aligned such that this perpendicular line overlaps with the reference point part in the alignment mark that is provided to the other of or both the display panel and the polarizing plate and at the same time, the display panel and the polarizing plate are aligned such that the linear indicator part of the alignment mark becomes parallel to the linear outer shape part. Thus, the display panel and the polarizing plate are aligned with high accuracy in a direction extending along the plate surface of themselves and in the circumferential direction around the center. Thus, the contrast performance is enhanced.

The alignment mark is disposed near the center of the display area. Therefore, as compared to the conventional case in which the alignment mark is disposed near an outer peripheral end that is farthest from the center of the display area, the display panel and the polarizing plate can be aligned easily. The alignment mark existing near the center of the display area may interrupt the display; however, since the alignment mark is disposed overlapping with the center non-display area in the display panel, the display is not interrupted, and therefore, the display quality is improved.

The embodiment of the present invention preferably has the following structures.

(1) The alignment mark may be formed by a hole edge of a polarizing plate penetration hole that is through the polarizing plate. The alignment mark includes at least the linear indicator part and the reference point part such that the planar shape thereof tends to be complicated. Therefore, when the alignment mark is formed by the hole edge of the penetration hole that penetrates the display panel, it may become difficult to process the display panel. In this regard, the alignment mark is formed by the hole edge of the polarizing plate penetration hole that penetrates the polarizing plate. Thus, the polarizing plate penetration hole and the alignment mark can be provided by processing the polarizing plate relatively easily, and the producing cost can be reduced.

(2) The display panel may include a panel penetration hole penetrating the display panel and communicating with the polarizing plate penetration hole, and the alignment mark may include a panel penetration hole parallel part extending along a part of a hole edge of the panel penetration hole. Thus, when the polarizing plate is disposed at the outer surface of the display panel, the polarizing plate penetration hole and the panel penetration hole communicate with each other. Since the panel penetration hole parallel part of the alignment mark formed by the hole edge of the polarizing plate penetration hole of the polarizing plate is disposed extending along a part of the hole edge of the panel penetration hole in the display panel, the external appearance is excellent.

(3) In the display panel, the panel penetration hole and the center non-display area may be similar in planar shape. This structure improves the external appearance when an image is displayed in the display area.

(4) The display device may further include a lighting device that supplies light for display to the display panel. The display panel may include the panel penetration hole penetrating the display panel and communicating with the polarizing plate penetration hole. The lighting device may include a lighting device penetration hole penetrating the lighting device and communicating with the panel penetration hole of the display panel. In this structure, when the lighting device and the display panel on which the polarizing plate is disposed are assembled together, the polarizing plate penetration hole of the polarizing plate, the panel penetration hole of the display panel, and the lighting device penetration hole of the lighting device communicate with each other. Such a structure enables a component to pass penetrating the polarizing plate penetration hole, the panel penetration hole, and the lighting device penetration hole that communicate with each other; therefore, this structure is preferable in varying the application of the display device.

(5) The alignment mark may include a cross linear part crossing the linear indicator part and include the reference point part at an intersection of the linear indicator part and the cross linear part. In this structure, when the polarizing plate is provided to the display panel, the reference point part at the intersection of the linear indicator part and the cross linear part can be extracted easily through an analysis of an image resulting from the imaging of the alignment mark with an imaging device, for example. Thus, the polarizing plate and the display panel can be aligned more easily.

(6) The alignment mark may include the reference point part at an equal distance from both ends of the linear indicator part. In such a structure, when the polarizing plate is provided to the display panel, for example, the reference point part at the equal distance from both ends of the linear indicator part is extracted through the analysis of the image resulting from the imaging of the alignment mark with the imaging device and on the basis of the reference point part, the polarizing plate and the display panel can be aligned.

(7) The alignment mark may have a planar shape that is an isosceles triangle whose base is the linear indicator part, and the reference point part may be disposed at an opposite vertex of the linear indicator part. In this structure, when the polarizing plate is provided to the display panel, for example, the reference point part at the opposite vertex of the linear indicator part can be easily extracted through the analysis of the image resulting from the imaging of the alignment mark with the imaging device. Thus, the polarizing plate and the display panel can be aligned more easily.

Advantageous Effect of the Invention

According to the present invention, alignment can be performed with high accuracy in the circumferential direction.

MODES FOR CARRYING OUT THE INVENTION

First Embodiment

A first embodiment according to the present invention is described with reference to FIG. 1 to FIG. 9. In the present embodiment, a liquid crystal display device (display device) 10 including a liquid crystal panel 11 as a display panel is described as an example. In a part of each drawing, an X axis, a Y axis, and a Z axis are shown and elements are drawn such that each axial direction coincides with the direction indicated in each drawing. In addition, an up-down direction is based on FIG. 2, FIG. 5, etc. and an upper side in these drawings is a front side and a lower side in these drawings is a back side.

Figure 1:
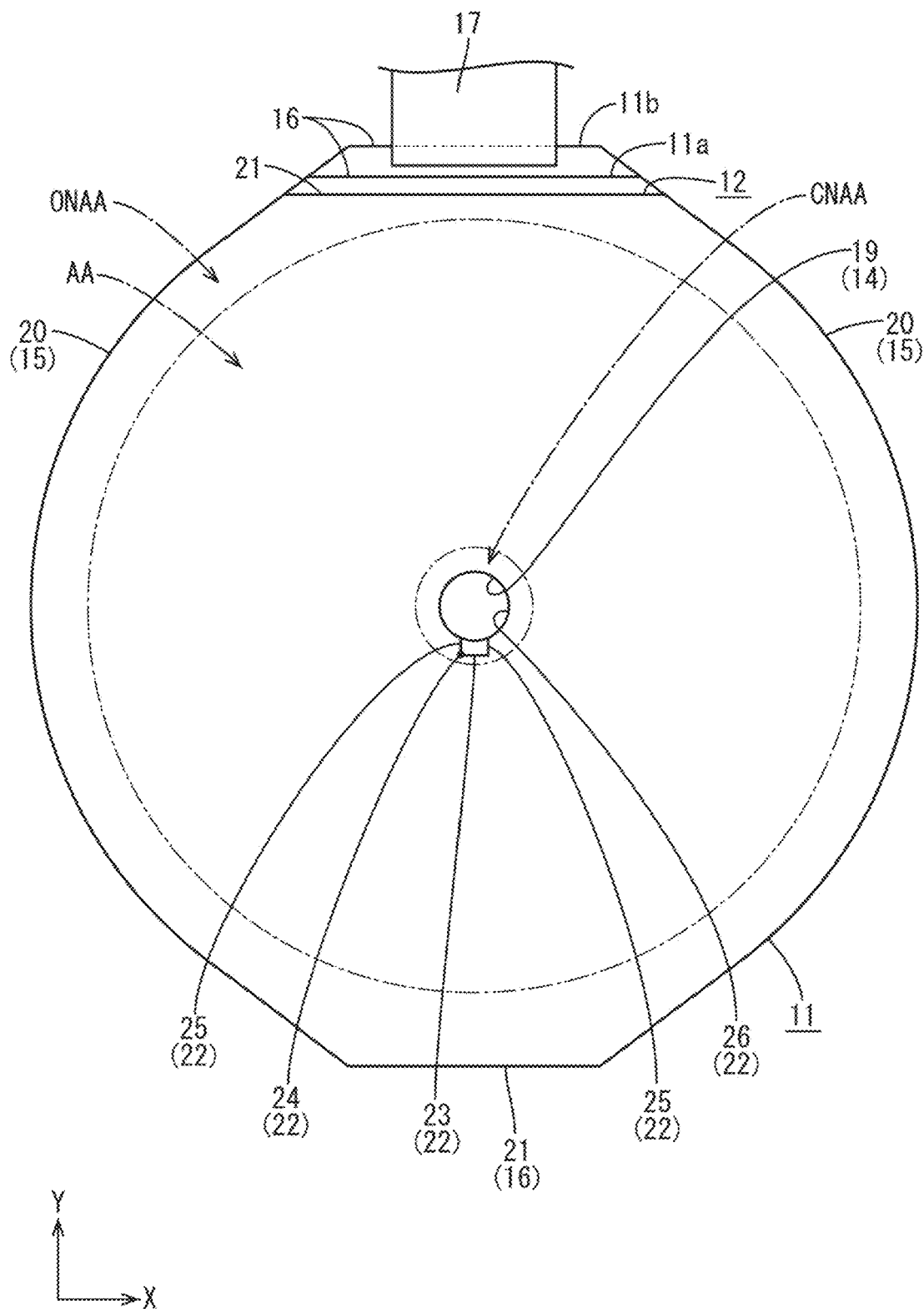
FIG. 1 is a plan view of a liquid crystal panel to which a polarizing plate of a liquid crystal display device according to a first embodiment of the present invention is attached.

The liquid crystal display device 10 has an approximately circular shape as a whole, and as illustrated in FIG. 1, includes at least the liquid crystal panel (display panel) 11 that can display an image, a pair of polarizing plates 12 on the front and back sides that is attached to outer surfaces on the front and back sides of the liquid crystal panel 11, and a backlight device (lighting device) 13 that is disposed on the back side of the liquid crystal panel 11 and supplies light for display to the liquid crystal panel 11. The liquid crystal display device 10 according to the present embodiment is preferably used for, but not limited to, a wearable terminal (not shown) such as a smart watch.

Figure 3:
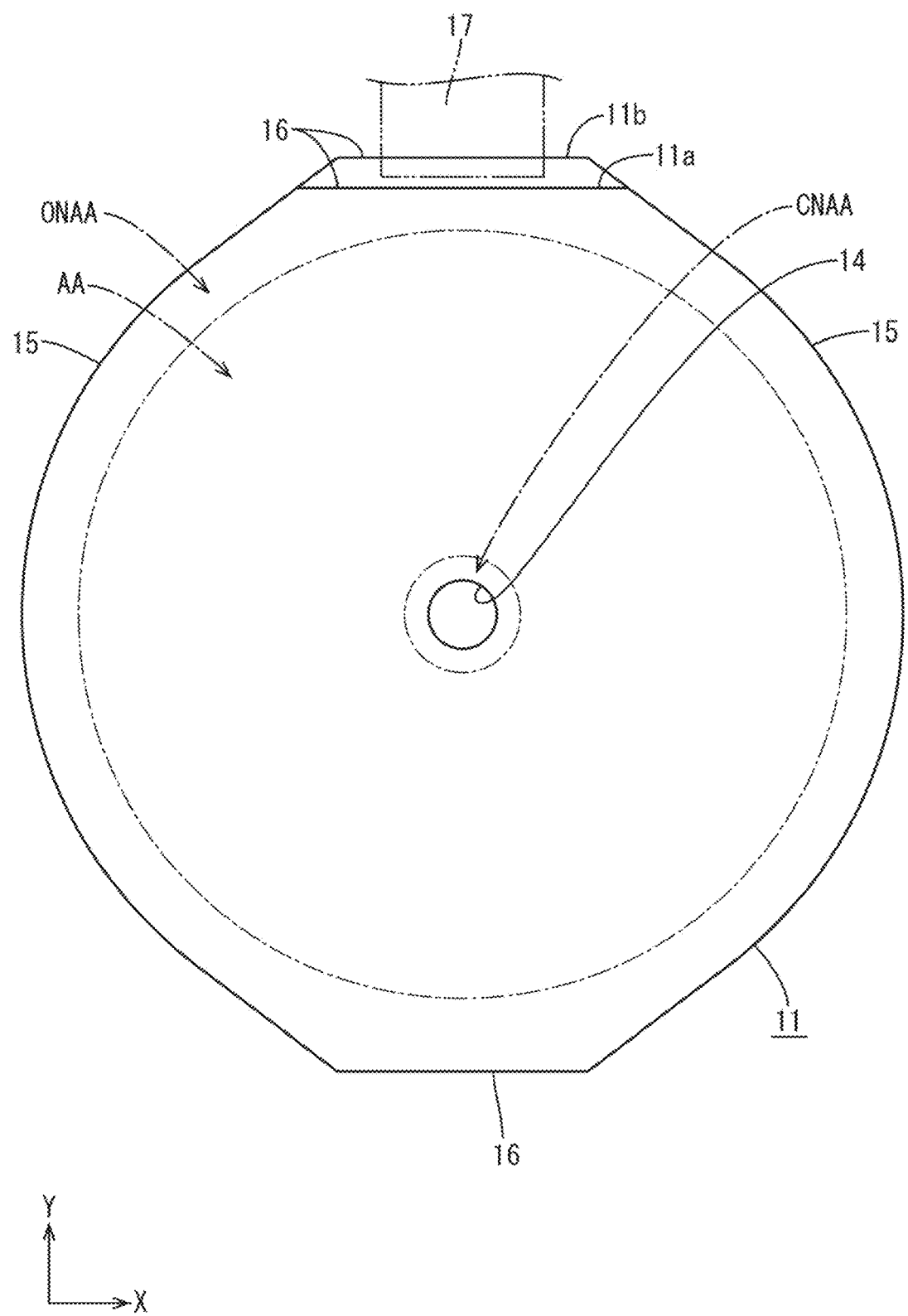
FIG. 3 is a plan view of the liquid crystal panel before the polarizing plate is attached thereto.

First, the liquid crystal panel 11 is described. The liquid crystal panel 11 has an outer shape thereof that is approximately circular in a plan view as illustrated in FIG. 1 and FIG. 3. At a center thereof, a panel penetration hole 14 is formed to penetrate along a plate thickness direction (Z-axis direction). The panel penetration hole 14 has a planar shape that is circular. Therefore, the liquid crystal panel 11 has an approximately annular shape as a whole (approximately doughnut-like shape). Specifically, the outer shape of the liquid crystal panel 11 is mostly panel-side curved outer shape parts (curved outer shape parts) 15 with an arc like shape in plan view, and partly panel-side linear outer shape parts (linear outer shape parts) 16 with a linear shape in a plan view. The panel-side linear outer shape parts 16 are provided as a pair at positions spaced apart by an angle of approximately 180° in a circumferential direction around the center of the liquid crystal panel 11, and the rest of the outer shape of the liquid crystal panel 11 is a pair of panel-side curved outer shape parts 15. The pair of panel-side linear outer shape parts 16 is parallel to each other. The panel-side curved outer shape parts 15 are curved like an arc with an approximately equal distance from the center of the liquid crystal panel 11 in a plan view. Note that in FIG. 1 and FIG. 3, an extending direction of the panel-side linear outer shape parts 16 coincides with the X-axis direction and an extending direction of a line (not shown in FIG. 1 or FIG. 3) perpendicular to the panel-side linear outer shape parts 16 coincides with the Y-axis direction. In addition, FIG. 3 illustrates the liquid crystal panel 11 before the polarizing plate 12 is mounted, and therefore, a flexible substrate 17 in this state, which is not mounted yet to the liquid crystal panel 11, is drawn with a two-dot chain line.

The liquid crystal panel 11 includes a display area AA where an image is displayed and its planar shape is annular as illustrated in FIG. 1 and FIG. 3. The liquid crystal panel 11 includes a center-side non-display area (center non-display area) CNAA that is on an inner peripheral side of the display area AA and that is positioned at the center, and an outer peripheral side non-display area ONAA that is on an outer peripheral side of the display area AA. These center-side non-display area CNAA and outer peripheral side non-display area ONAA do not display an image. The center-side non-display area CNAA includes, in addition to the panel penetration hole 14, a hole edge of the panel penetration hole 14, and has a circular shape in a plan view. Therefore, in the liquid crystal panel 11, the panel penetration hole 14 and the center-side non-display area CNAA are similar in planar shape, and thus the external appearance when the image is displayed in the display area AA is excellent. The outer peripheral side non-display area ONAA has an approximately annular shape in a plan view; the planar shape at an inner peripheral edge is circular and the planar shape at an outer peripheral edge coincides with the outer shape of the liquid crystal panel 11. In FIG. 1 and FIG. 3, a border position between the display area AA and the center-side non-display area CNAA and a border position between the display area AA and the outer peripheral side non-display area ONAA are each drawn with a dot-chain line.

Figure 2:
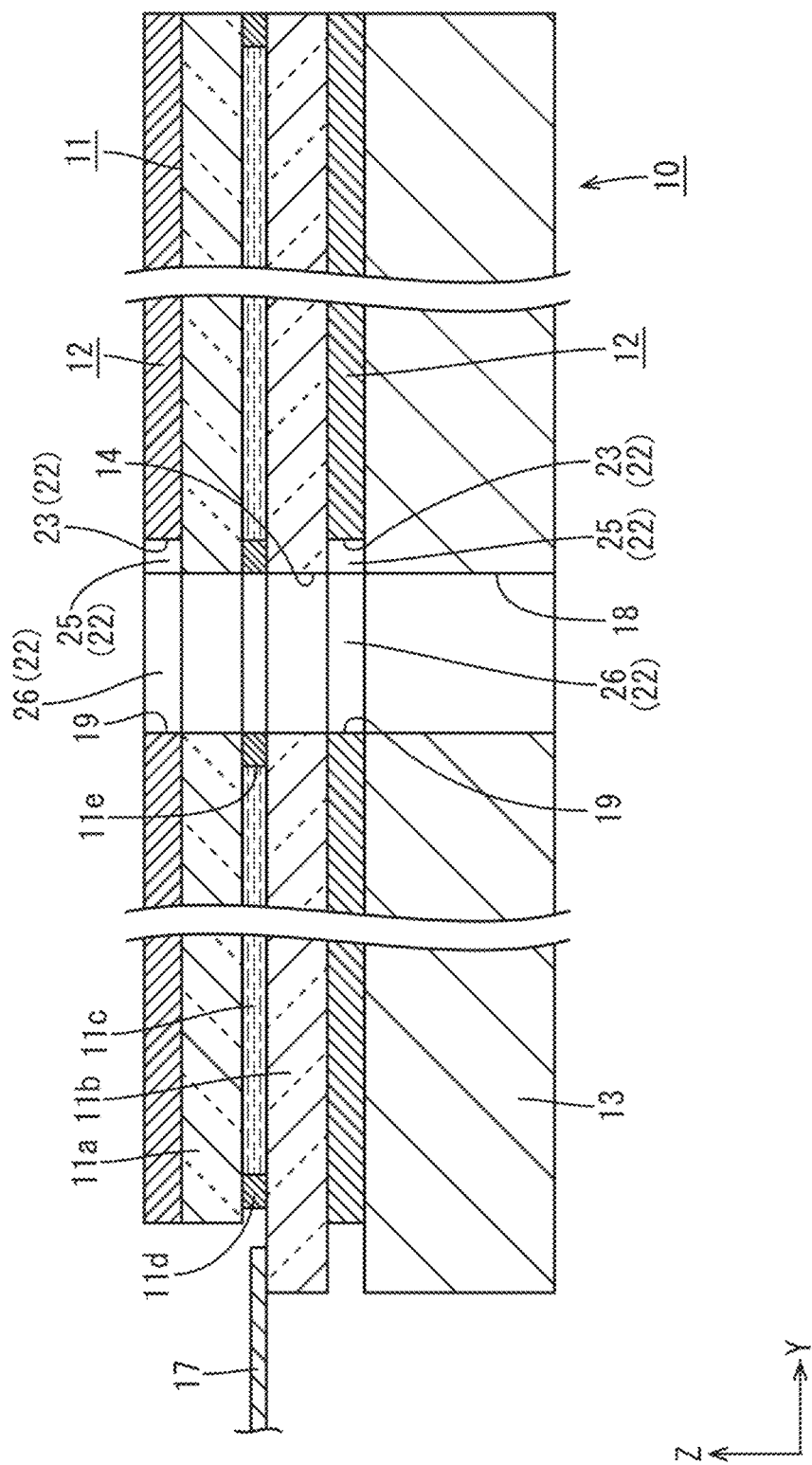
FIG. 2 is a cross-sectional view of the liquid crystal display device.

As illustrated in FIG. 2, the liquid crystal panel 11 includes at least: a pair of substrates 11a and 11b made of glass that is substantially transparent and has a high light-transmitting property; liquid crystal 11c that is held between the substrates 11a and 11b and includes liquid crystal molecules corresponding to a material whose optical characteristic changes as an electric field is applied; an outer peripheral side sealing part 11d that is provided to surround the liquid crystal 11c, exists between outer peripheral ends of the pair of substrates 11a and 11b, and seals the liquid crystal 11c; and an inner peripheral side sealing part 11e that exists between inner peripheral ends of the pair of substrates 11a and 11b and seals the liquid crystal 11c. The outer peripheral side sealing part 11d is provided to be extended along the outer shape of the liquid crystal panel 11, has an approximately annular shape, and is disposed in the outer peripheral side non-display area ONAA. The inner peripheral side sealing part 11e is provided to be extended along the hole edge of the panel penetration hole 14, has an approximately annular shape, and is disposed in the center-side non-display area CNAA.

Of the pair of substrates 11a and 11b in the liquid crystal panel 11, the substrate on the front side (front surface side) is a CF substrate 11a and the substrate on the back side (rear surface side) is an array substrate 11b. In the array substrate 11b, as illustrated in FIG. 1 and FIG. 3, one of the panel-side linear outer shape parts 16 is flush with the same panel-side linear outer shape part 16 of the CF substrate 11a and the other of the panel-side linear outer shape parts 16 is disposed to protrude more outward than the same panel-side linear outer shape part 16 of the CF substrate 11a, and in this protruding part, the flexible substrate 17 is attached. On the flexible substrate 17, drivers that are not shown are mounted by COF (chip on film). The drivers can process various input signals supplied from a panel driving circuit board that is not shown, and supply the signals to the liquid crystal panel 11.

An inner structure (not shown) in the display area AA of the liquid crystal panel 11 is briefly described; however, various components described below are not illustrated. On an inner surface side of the array substrate 11b (on the liquid crystal 11c side, the surface side that faces the CF substrate 11a), a number of TFTs (Thin Film Transistors) serving as switching elements and pixel electrodes are arranged in matrix (rows and columns), and these TFTs and the pixel electrodes are surrounded by gate lines and source lines that are disposed in a lattice form. To the gate line and the source line, the signals for the image are supplied from the drivers. The pixel electrodes disposed in a rectangular area surrounded by the gate lines and the source lines are formed of a transparent electrode material. Furthermore, a common electrode is provided on the inner surface side of the array substrate 11b in a manner of facing (overlapping) the pixel electrode through an insulating layer. The common electrode is provided substantially as a solid pattern made of a transparent electrode material similar to the material of the pixel electrode, and to the common electrode, a common potential (reference potential) that is always substantially constant is supplied. Therefore, the liquid crystal panel 11 according to the present embodiment employs a method in which a direction of an electric field to be applied to the liquid crystal 11c is substantially parallel to the plate surface of each of the substrates 11a and 11b, that is, a horizontal electric field method such as an IPS (In-Plane Switching) method or an FFS (Fringe Field Switching) method. The liquid crystal panel 11 having employed such a horizontal electric field method is advantageous in the viewing angle characteristic over a vertical electric field method such as a TN (twisted nematic) method; however, in the horizontal electric field method, the condition for mounting the polarizing plate 12 to the liquid crystal panel 11 is severe and even a slight displacement in position of mounting the polarizing plate 12 in the circumferential direction around the center of the liquid crystal panel 11 may result in the deterioration in contrast performance.

On the other hand, a number of color filters are provided on an inner surface side of the CF substrate 11a at positions in accordance with the pixel electrodes. The color filters are disposed in a manner that three colors of R, G, and B are alternately arranged. Between the color filters, a light-blocking layer (black matrix) for preventing color mixing is formed. On the inner surface side of both substrates 11a and 11b, an orientation film (not shown) for orienting the liquid crystal molecules included in the liquid crystal 11c is formed. The orientation film is formed of, for example, polyimide, and is formed in a solid form on the inner surface side of the substrates 11a and 11b. The orientation film can, when irradiated with light in a particular wavelength region (for example, ultraviolet ray), orient the liquid crystal molecules in accordance with a direction where the light is delivered.

Here, first, the backlight device 13 is described briefly. The backlight device 13 is disposed such that the outer shape becomes approximately circular like the liquid crystal panel 11 in plan view, and moreover is disposed so as to overlap with the back side of the liquid crystal panel 11 (side opposite to the emission side) as illustrated in FIG. 2. The backlight device 13 includes at least a light source (such as LED or organic EL) that is not shown and an optical member (such as a light guide plate, a diffusion sheet, or a prism sheet) that is not shown. The optical member has a function of, for example, shaping light emitted from the light source into planar light. At a center of the backlight device 13, a backlight penetration hole (lighting device penetration hole) 18 that penetrates the backlight device 13 along the plate thickness direction (Z-axis direction) is provided. The backlight penetration hole 18 has a planar shape that is circular similar to the panel penetration hole 14 of the liquid crystal panel 11, and communicates with the panel penetration hole 14. That is to say, the backlight penetration hole 18 is disposed in a manner of overlapping with the center-side non-display area CNAA of the liquid crystal panel 11 together with the panel penetration hole 14 in a plan view. The backlight penetration hole 18 has its diameter dimension substantially the same as that of the panel penetration hole 14. Therefore, when the liquid crystal panel 11 and the backlight device 13 are disposed concentrically, the panel penetration hole 14 and the backlight penetration hole 18 are aligned such that their inner peripheral surfaces are substantially flush with each other.

Figure 4:
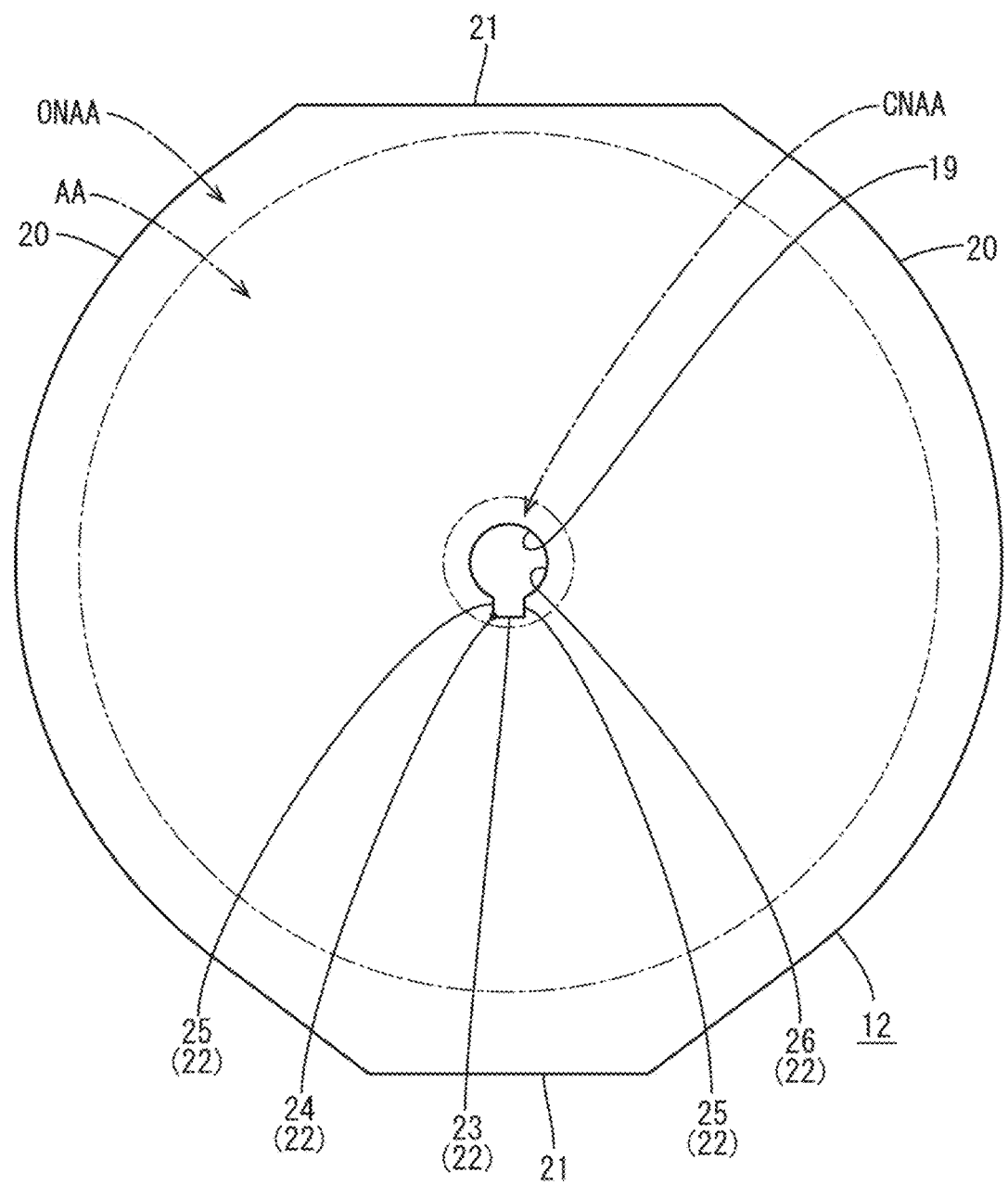
FIG. 4 is a plan view of the polarizing plate.

Next, the polarizing plate 12 is described in detail. As illustrated in FIG. 1 and FIG. 4, the polarizing plate 12 has its outer shape that is approximately circular in a plan view, and at its center, a polarizing plate penetration hole 19 is formed to penetrate in the plate thickness direction (Z-axis direction). The polarizing plate penetration hole 19 has its planar shape that is approximately circular, and communicates with the panel penetration hole 14 of the liquid crystal panel 11 and the backlight penetration hole 18 of the backlight device 13. Therefore, the polarizing plate 12 has an approximately annular shape (approximately doughnut-like shape) as a whole similar to the liquid crystal panel 11 and the backlight device 13. The polarizing plate penetration hole 19 is disposed at a position overlapping with the center-side non-display area CNAA of the liquid crystal panel 11 in a plan view. Such a structure enables a component to pass penetrating the polarizing plate penetration hole 19, the panel penetration hole 14, and the backlight penetration hole 18 that communicate with each other; therefore, this structure is preferable in varying the application of the liquid crystal display device 10. The outer shape of the polarizing plate 12 is mostly polarizing plate-side curved outer shape parts (curved outer shape parts) 20 with an arc like shape in plan view and partly polarizing plate-side linear outer shape parts (linear outer shape parts) 21 with a linear shape in plan view. The polarizing plate-side linear outer shape parts 21 are provided as a pair at positions spaced apart by an angle of approximately 180° in a circumferential direction around the center of the polarizing plate 12, and the rest of the outer shape of the polarizing plate 12 is a pair of polarizing plate-side curved outer shape parts 20. The pair of polarizing plate-side linear outer shape parts 21 is parallel to each other, and also parallel to the panel-side linear outer shape parts 16 of the liquid crystal panel 11. The polarizing plate-side curved outer shape parts 20 are curved like an arc with an approximately equal distance from the center of the polarizing plate 12 in a plan view. Note that in FIG. 1 and FIG. 4, an extending direction of the polarizing plate-side linear outer shape parts 21 coincides with the X-axis direction and an extending direction of a line (not shown in FIG. 1 or FIG. 4) perpendicular to the polarizing plate-side linear outer shape parts 21 coincides with the Y-axis direction.

The polarizing plate 12 has a film-like shape with a plate surface extended along the plate surface of the liquid crystal panel 11 as illustrated in FIG. 2, and includes at least a polarizing layer for generating linearly polarized light out of natural light. The polarizing layer has a structure in which a polarizer is held between protective films such as a TAC (triacetylcellulose) film. The polarizer is obtained by mixing an absorber such as iodine or dichroic dye with a polymer resin film such as a PVA (polyvinyl alcohol) film and stretching the mixture in one direction to align the absorber. The polarizing plate 12 including such a uniaxially stretched polarizing layer includes a transmission axis (polarization axis) and an absorption axis that is orthogonal to the transmission axis, and thus can convert circularly polarized light into linearly polarized light. The polarizing plate 12 includes a laminator layer (protecting layer) that is stacked on an outer surface side of the polarizing layer (opposite to the liquid crystal panel 11 side) to protect the polarizing layer, and a fixing layer that is stacked on an inner surface side of the polarizing layer (on the liquid crystal panel 11 side) to be fixed to the outer surface of the liquid crystal panel 11. The fixing layer includes an adhesive material to be applied to the inner surface of the polarizing layer. A specific structure of the polarizing plate 12 is not limited to the above structure, and for example, can be changed as appropriate by adding a retardation plate.

A pair of such polarizing plates 12 with the above structure is attached to front and back outer surfaces of the liquid crystal panel 11 as illustrated in FIG. 2. The polarizing plate 12 disposed on the front side of the liquid crystal panel 11 and the polarizing plate 12 on the back side thereof are disposed such that their transmission axes (absorption axes) are orthogonal to each other, that is, crossed Nichol arrangement. By this crossed Nichol arrangement, the liquid crystal panel 11 is in a normally black mode where the transmittance is the minimum and display is in black when current is not supplied (voltage is not applied to the pixel electrode). When the polarizing plate 12 is attached to the liquid crystal panel 11, it is necessary to align the polarizing plate 12 with the liquid crystal panel 11 such that the polarization axis or the transmission axis of the polarizing plate 12 is aligned with the orientation axis of the orientation film in the liquid crystal panel 11. Here, if the polarization axis or the transmission axis of the polarizing plate 12 is displaced from the orientation axis of the orientation film, light easily leaks out even in the black display, in which case the contrast performance may deteriorate. In particular, in the liquid crystal panel 11 of the horizontal electric field method as in the present embodiment, a slight displacement of the polarization axis or the transmission axis of the polarizing plate 12 from the orientation axis of the orientation film may result in the light leak and the drastic deterioration in contrast performance.

In view of this, the polarizing plate 12 according to the present embodiment includes an alignment mark 22 used for alignment between the liquid crystal panel 11 and the polarizing plate 12 in the circumferential direction around the center of the liquid crystal panel 11 as illustrated in FIG. 1 and FIG. 4. The alignment mark 22 is formed by a hole edge of the polarizing plate penetration hole 19 that penetrates the polarizing plate 12. A planar shape of the alignment mark 22 includes at least a linear indicator part 23 that is linear in parallel to the panel-side linear outer shape part 16 and the polarizing plate-side linear outer shape part 21, and a reference point part 24 that overlaps with the linear indicator part 23. The alignment mark 22 formed by the hole edge of the polarizing plate penetration hole 19 in the polarizing plate 12 is disposed at the position overlapping with the center-side non-display area CNAA in the liquid crystal panel 11.

In such a structure, when the polarizing plate 12 is attached to the outer surface of the liquid crystal panel 11, first, a perpendicular bisector PL to the panel-side linear outer shape part 16 is obtained. The liquid crystal panel 11 and the polarizing plate 12 are aligned such that this perpendicular bisector PL overlaps with the reference point part 24 in the alignment mark 22 that is provided to the polarizing plate 12 and at the same time, the liquid crystal panel 11 and the polarizing plate 12 are aligned such that the linear indicator part 23 of the alignment mark 22 becomes parallel to the panel-side linear outer shape part 16 and the polarizing plate-side linear outer shape part 21. Thus, the liquid crystal panel 11 and the polarizing plate 12 are aligned with high accuracy in the direction along the plate surface thereof and the circumferential direction around the center thereof. Accordingly, the contrast performance becomes higher. Since this alignment mark 22 is disposed near the center of the display area AA in the liquid crystal panel 11, the alignment between the liquid crystal panel 11 and the polarizing plate 12 is easier than that in the conventional case where the alignment mark is disposed near an outer peripheral end that is farthest from the center of the display area. The alignment mark 22 may interrupt the display because of being present near the center of the display area AA; however, since the alignment mark 22 is disposed at the position overlapping the center-side non-display area CNAA in the liquid crystal panel 11, the display is not interrupted, and therefore, the display quality becomes higher. The alignment mark 22 includes at least the linear indicator part 23 and the reference point part 24 as described above such that the planar shape thereof tends to be complicated. However, since the alignment mark 22 is formed by the hole edge of the polarizing plate penetration hole 19 that is provided to penetrate the polarizing plate 12, the polarizing plate penetration hole 19 and the alignment mark 22 can be provided by processing the polarizing plate 12 relatively easily as compared to the case in which the alignment mark is formed by the hole edge of the panel penetration hole 14 that penetrates the liquid crystal panel 11 and glass substrates 11a and 11b of the liquid crystal panel 11 are processed. Thus, the producing cost can be reduced.

Specifically, the polarizing plate penetration hole 19 of the alignment mark 22 has its opening range larger than the opening range of the panel penetration hole 14 as illustrated in FIG. 1 and FIG. 4. Specifically, the polarizing plate penetration hole 19 is mostly parallel to the panel penetration hole 14 and partly expanded outward with respect to the panel penetration hole 14. An expansion part thereof is rectangular in plan view. The linear indicator part 23 in the alignment mark 22 includes a part of the expansion part of the polarizing plate penetration hole 19 that is parallel to the X-axis direction. It can be said that the alignment mark 22 includes a pair of perpendicular line parallel parts (cross linear parts) 25 that continues to both ends of the linear indicator part 23 and is parallel to the perpendicular bisector PL of the linear indicator part 23, and a panel penetration hole parallel part 26 that is extended along a part of the hole edge of the panel penetration hole 14. The pair of perpendicular line parallel parts 25 includes a part extended linearly along the Y-axis direction in the expansion part of the polarizing plate penetration hole, that is, the extending direction of the perpendicular bisector PL, and is in relation of being orthogonal to (intersecting with) the linear indicator part 23. One of the perpendicular line parallel parts 25 (that is on the left side in FIG. 1 and FIG. 4) has one end side continuing to one end part of the linear indicator part 23, and has the other end side continuing to one end part of the panel penetration hole parallel part 26. The other of the perpendicular line parallel parts 25 (that is on the right side in FIG. 1 and FIG. 4) has one end side continuing to the other end part of the linear indicator part 23, and has the other end side continuing to the other end part of the panel penetration hole parallel part 26. In the present embodiment, the reference point part 24 is disposed at a linking position, that is, an intersection of the one end part of the one perpendicular line parallel part 25 and the one end part of the linear indicator part 23. By such a structure, when the polarizing plate 12 is attached to the liquid crystal panel 11, for example, the reference point part 24 at the intersection of the linear indicator part 23 and the perpendicular line parallel part 25 can be extracted easily through the analysis of an image resulting from the imaging of the alignment mark 22 with the imaging device. Thus, the polarizing plate 12 and the liquid crystal panel 11 can be aligned more easily.

As illustrated in FIG. 1 and FIG. 4, the panel penetration hole parallel part 26 is extended in parallel to the most part of the hole edge of the panel penetration hole 14 that is like an arc along the entire periphery, and its central angle is over 180°, or even over 270°. The panel penetration hole parallel part 26 is flush with the hole edge of the panel penetration hole 14. That is to say, the polarizing plate penetration hole 19 has its diameter dimension substantially the same as that of the panel penetration hole 14. When the liquid crystal panel 11 and the polarizing plate 12 are disposed concentrically, the panel penetration hole 14 and the polarizing plate penetration hole 19 are generally aligned such that the panel penetration hole parallel part 26 is substantially flush with the hole edge of the panel penetration hole 14. Thus, the panel penetration hole parallel part 26 of the alignment mark 22 including the polarizing plate penetration hole 19 of the polarizing plate 12 is extended along the most part of the hole edge of the panel penetration hole 14 in the liquid crystal panel 11; thus, the liquid crystal display device 10 has the excellent external appearance.

The present embodiment has the structure as described above, and next, its operation will be described. A step of producing the liquid crystal panel 11 having the liquid crystal 11c held between the pair of substrates 11a and 11b (liquid crystal panel producing step) is followed by a step of attaching the polarizing plate 12, which is separately produced through a polarizing plate producing step, to front and back outer surfaces (polarizing plate attaching step, polarizing plate setting step).

Figure 5:
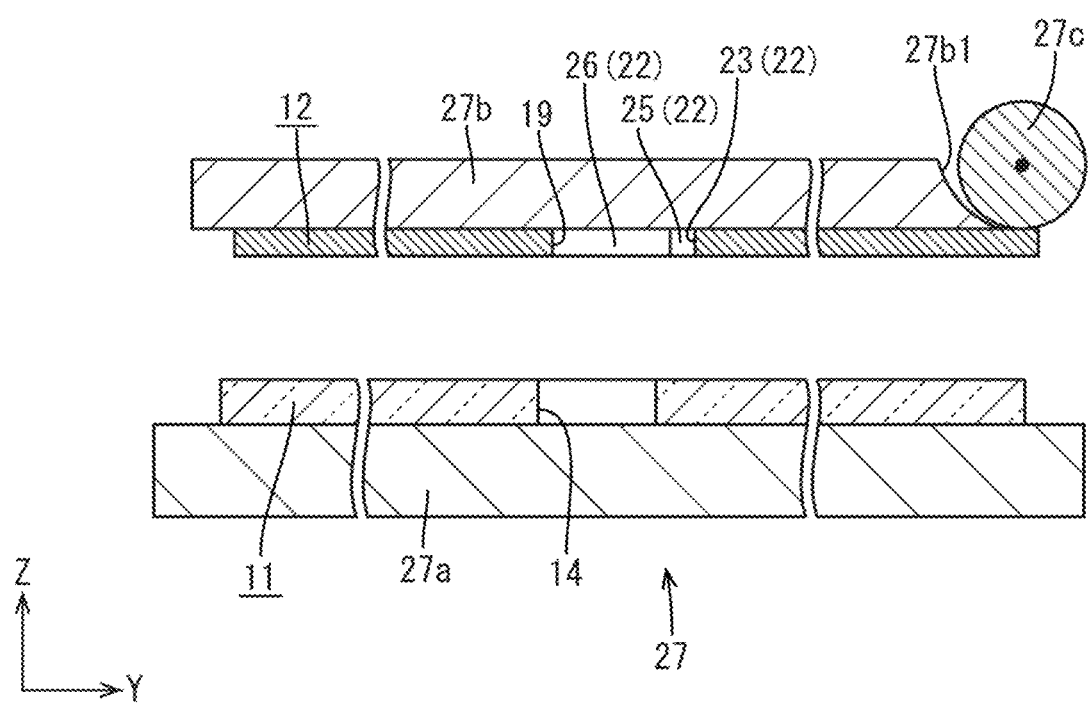
FIG. 5 is a cross-sectional view of a polarizing plate attaching device in which a polarizing plate supporting stage is in an initial posture.

In this polarizing plate attaching step, a polarizing plate attaching device (polarizing plate setting device) 27 is used. As illustrated in FIG. 5, the polarizing plate attaching device 27 includes at least the following components: a panel supporting stage (panel supporting part) 27a that supports the liquid crystal panel 11; a polarizing plate supporting stage 27b that supports the polarizing plate 12 in a posture of facing the outer surface of the liquid crystal panel 11; a pressing roller 27c that rotatably presses the polarizing plate 12 against the liquid crystal panel 11; a movement mechanism (not shown) that moves the panel supporting stage 27a, the polarizing plate supporting stage 27b, and the pressing roller 27c relatively along the outer surface of the liquid crystal panel 11; and an imaging device (not shown) that images the liquid crystal panel 11 and the polarizing plate 12.

Figure 6:
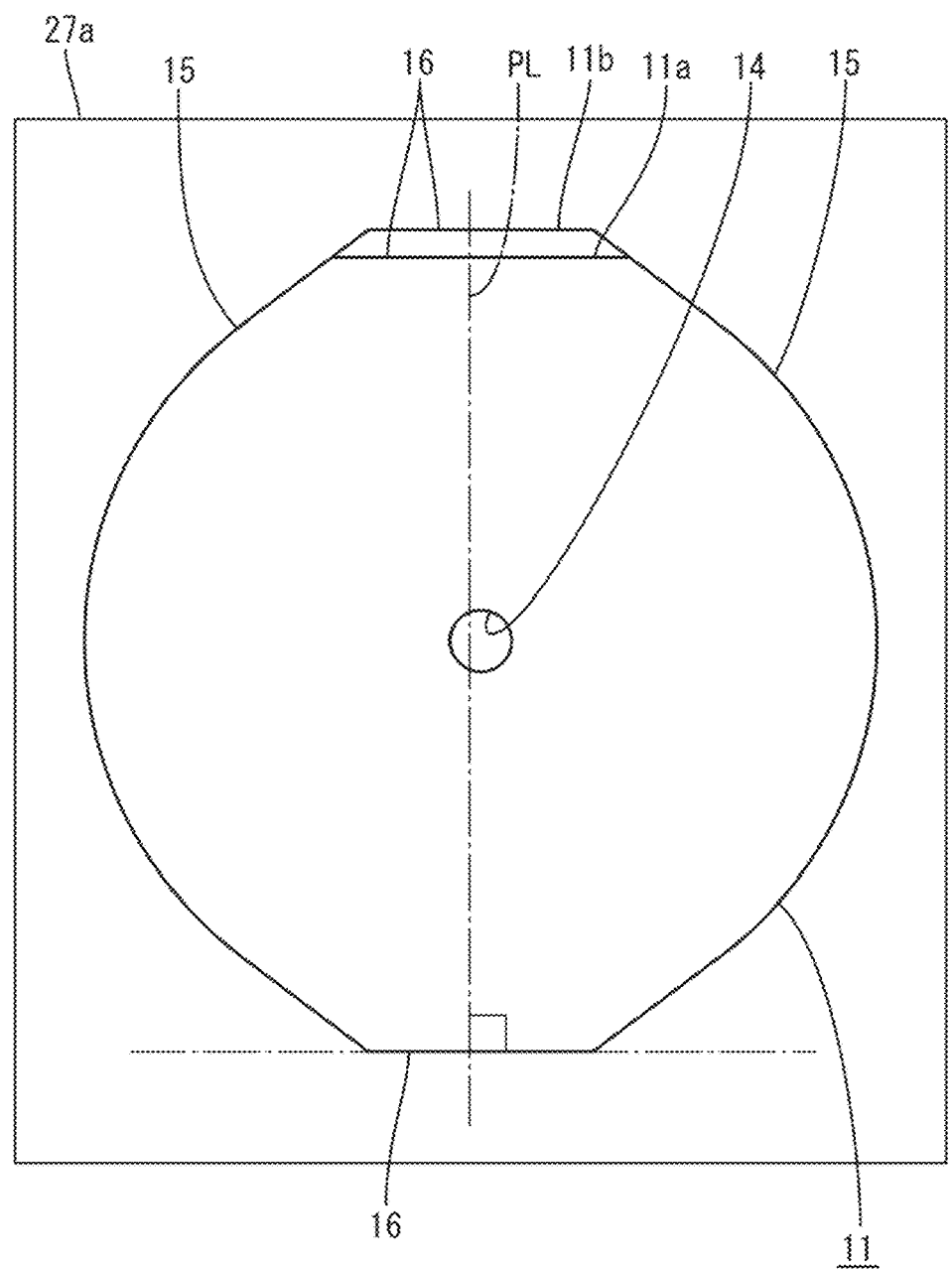
FIG. 6 is a plan view of a panel supporting stage and the liquid crystal panel supported thereby.
Figure 7:
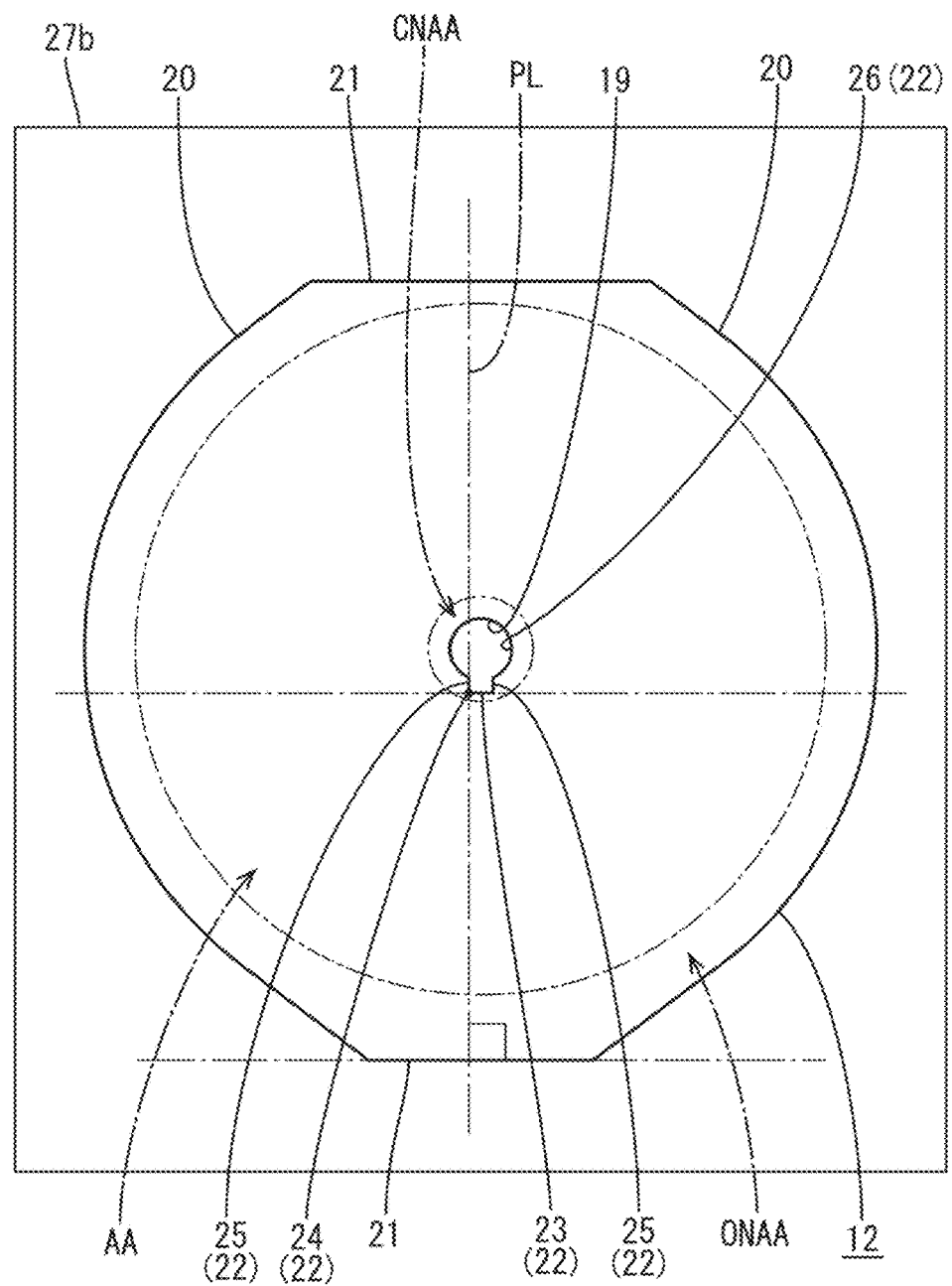
FIG. 7 is a plan view of a polarizing plate supporting stage and the polarizing plate supported thereby.

The panel supporting stage 27a and the polarizing plate supporting stage 27b have a supporting surface in parallel to each plate surface of the liquid crystal panel 11 and the polarizing plate 12 as illustrated in FIG. 5, and include a vacuum suction mechanism (not shown) that sucks the liquid crystal panel 11 and the polarizing plate 12 to vacuum. It can be said that the panel supporting stage 27a is not movable relative to the polarizing plate supporting stage 27b or the pressing roller 27c in the X-axis direction and the Y-axis direction (direction along the plate surface of the liquid crystal panel 11, horizontal direction) and is "a fixed stage" that is fixed type as illustrated in FIG. 5 and FIG. 6. The polarizing plate supporting stage 27b is relatively displaceable by the movement mechanism in the circumferential direction (θ direction) around the center of the polarizing plate 12 (liquid crystal panel 11) in addition to the X-axis direction and the Y-axis direction with respect to the panel supporting stage 27a as illustrated in FIG. 5 and FIG. 7. In addition, the polarizing plate supporting stage 27b includes a tilting mechanism (not shown) that tilts between the posture (initial posture) in which the plate surface of the polarizing plate 12 is parallel to the outer surface of the liquid crystal panel 11 and the posture (attaching posture, see FIG. 8 and FIG. 9) in which the plate surface of the polarizing plate 12 is tilted relative to the outer surface of the liquid crystal panel 11. The pressing roller 27c is housed in a roller receiving concave part 27b1 provided to the polarizing plate supporting stage 27b, and is pivotally supported in a manner of being rotatable around a rotation shaft that is parallel to the X-axis direction. The pressing roller 27c is displaceable relative to the panel supporting stage 27a in linkage with (following) the polarizing plate supporting stage 27b by the movement mechanism and the tilting mechanism.

Next, the polarizing plate attaching step is described in detail. First, as illustrated in FIG. 5, the liquid crystal panel 11 in the state before the flexible substrate 17 is mounted to the surface of the panel supporting stage 27a on the polarizing plate supporting stage 27b side is set and sucked to vacuum, and moreover the polarizing plate 12 is set to the surface of the polarizing plate supporting stage 27b on the panel supporting stage 27a side and sucked to vacuum. Then, the liquid crystal panel 11 and the polarizing plate 12 that are provided to face each other are imaged with the imaging device. The image resulting from the imaging with the imaging device is processed, and thus, the perpendicular bisector PL for the panel-side linear outer shape part 16 of the outer shape of the liquid crystal panel 11 is obtained as illustrated in FIG. 6. Subsequently, the positional relation between the obtained perpendicular bisector PL and the alignment mark 22 is compared. This comparison can be performed by the image processing or by visual observation of an operator. Specifically, as illustrated in FIG. 7, whether the reference indicator part 24 included in the alignment mark 22 of the polarizing plate 12 overlaps with the perpendicular bisector PL is checked. If the perpendicular bisector PL is not overlapped with the reference indicator part 24, the movement mechanism displaces the polarizing plate supporting stage 27b relative to the panel supporting stage 27a in any of the X-axis direction, the Y-axis direction, and the circumferential direction, so that the polarizing plate 12 is aligned such that the perpendicular bisector PL overlaps with the reference indicator part 24. Along with this, the parallel degree between the linear indicator part 23 included in the alignment mark 22 and the panel-side linear outer shape part 16 is also checked. In the case where the linear indicator part 23 is in the positional relation of intersecting with the panel-side linear outer shape part 16, the movement mechanism displaces the polarizing plate supporting stage 27b relative to the panel supporting stage 27a in the circumferential direction such that the polarizing plate 12 is aligned such that the linear indicator part 23 becomes parallel to the panel-side linear outer shape part 16.

As thus described, the polarizing plate 12 is aligned with the liquid crystal panel 11 with high accuracy regarding the X-axis direction, the Y-axis direction, and the circumferential direction. Therefore, the polarization axis or the transmission axis of the polarizing plate 12 is in the positional relation of substantially coinciding with the orientation axis of the orientation film in the liquid crystal panel 11 of the horizontal electric field method with high accuracy. Attaching the polarizing plate 12 to the liquid crystal panel 11 in this state substantially prevents the light leak during the black display, for example, and therefore, the contrast performance of the liquid crystal display device 10 can be maintained high. In particular, the alignment mark 22, which corresponds to the indicator in the alignment, is disposed at the center of the display area AA in the liquid crystal panel 11; therefore, as compared to the conventional case in which the alignment mark is disposed near the outer peripheral end that is farthest from the center of the display area, it is easy to align the polarizing plate 12 and the liquid crystal panel 11, which is advantageous. Note that instead of checking the parallel degree between the linear indicator part 23 and the panel-side linear outer shape part 16, the parallel degree between the polarizing plate-side linear outer shape part 21 and the panel-side linear outer shape part 16 may be checked.

Figure 8:
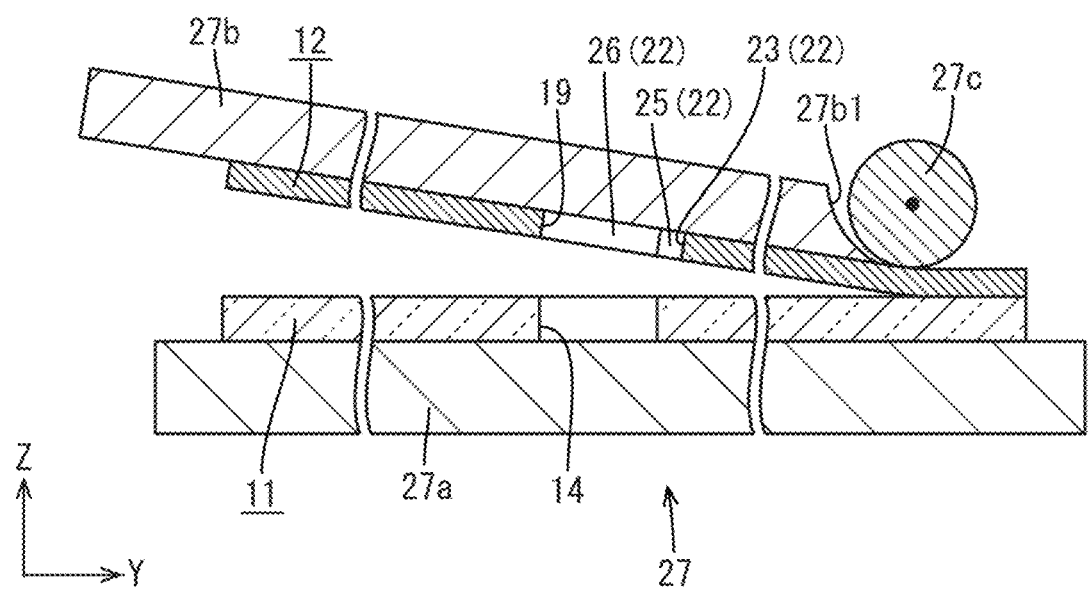
FIG. 8 is a cross-sectional view of the polarizing plate attaching device in a state in the middle of attaching the polarizing plate.
Figure 9:
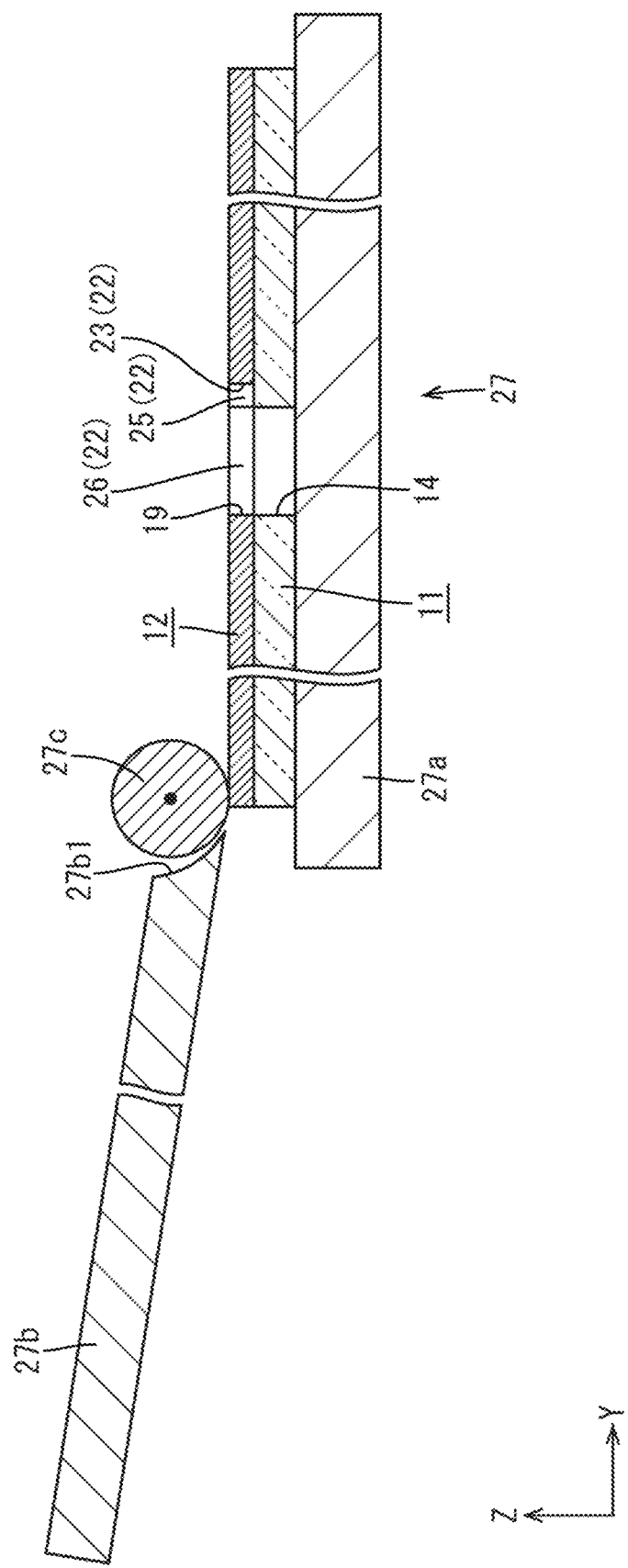
FIG. 9 is a cross-sectional view of the polarizing plate attaching device in a state after attaching the polarizing plate.

After the polarizing plate 12 is aligned with the liquid crystal panel 11 as above, the polarizing plate supporting stage 27b in the initial posture is tilted to the attaching posture and, as illustrated in FIG. 8, one end side of the polarizing plate 12 is brought into contact with the outer surface of the liquid crystal panel 11 and at the same time the pressing roller 27c is brought into contact with the one end side of the polarizing plate 12. After that, the polarizing plate supporting stage 27b and the pressing roller 27c are displaced to the left in FIG. 8 with respect to the panel supporting stage 27a regarding the Y-axis direction, and at the same time the pressing roller 27c is rotated, so that the polarizing plate 12 is attached sequentially to the outer surface of the liquid crystal panel 11 from the one end side to the other end side. Then, when the pressing roller has reached the other end side of the polarizing plate 12 as illustrated in FIG. 9, the whole polarizing plate 12 is attached to the outer surface of the liquid crystal panel 11.

As described above, the liquid crystal display device (display device) 10 according to the present embodiment includes: the liquid crystal panel (display panel) 11 including at least the display area AA where an image is displayed and the center-side non-display area (center non-display area) CNAA disposed at the center of the display area AA; the polarizing plate 12 disposed at the outer surface of the liquid crystal panel 11; the panel-side curved outer shape part 15 and the polarizing plate-side curved outer shape part 20 (curved outer shape part) that are provided to at least a part of the outer shape of at least one of the liquid crystal panel 11 and the polarizing plate 12 and have the planar shape that is curved; the panel-side linear outer shape part 16 and the polarizing plate-side linear outer shape part 21 (linear outer shape part) that are provided to at least a part of the outer shape of one of or both the liquid crystal panel 11 and the polarizing plate 12 and have the planar shape that is linear; and the alignment mark 22 disposed at the position that overlaps with the center-side non-display area CNAA and including at least the linear indicator part 23 that is provided to the other of or both the polarizing plate 12 and the liquid crystal panel 11 and has the planar shape that is linear in parallel to the panel-side linear outer shape part 16 and the polarizing plate-side linear outer shape part 21, and the reference point part 24 overlapping with the linear indicator part 23.

In this structure, the panel-side curved outer shape part 15 and the polarizing plate-side curved outer shape part 20 whose planar shape is curved are provided to at least a part of the outer shape of at least one of the liquid crystal panel 11 and the polarizing plate 12. Therefore, when the polarizing plate 12 is disposed at the outer surface of the liquid crystal panel 11, it is difficult to align the both in the circumferential direction around the center of the display area AA. On the other hand, the panel-side linear outer shape part 16 and the polarizing plate-side linear outer shape part 21 whose planar shape is linear are provided to at least a part of the outer shape of one of or both the liquid crystal panel 11 and the polarizing plate 12. Therefore, when the polarizing plate 12 is disposed, a perpendicular line to the panel-side linear outer shape part 16 and the polarizing plate-side linear outer shape part 21 is obtained first. Then, the liquid crystal panel 11 and the polarizing plate 12 are aligned such that this perpendicular line overlaps with the reference point part 24 in the alignment mark 22 that is provided to the other of or both the liquid crystal panel 11 and the polarizing plate 12 and at the same time, the liquid crystal panel 11 and the polarizing plate 12 are aligned such that the linear indicator part 23 of the alignment mark 22 becomes parallel to the panel-side linear outer shape part 16 and the polarizing plate-side linear outer shape part 21. Thus, the liquid crystal panel 11 and the polarizing plate 12 are aligned with high accuracy in the direction along the plate surface thereof and the circumferential direction around the center thereof. Accordingly, the contrast performance becomes higher.

Since the aforementioned alignment mark 22 is disposed near the center of the display area AA, the alignment between the liquid crystal panel 11 and the polarizing plate 12 is easy as compared to that in the conventional case where the alignment mark 22 is disposed near the outer peripheral end that is farthest from the center of the display area AA. This alignment mark 22 may interrupt the display because of being present near the center of the display area AA; however, since the alignment mark 22 is disposed at the position overlapping the center-side non-display area CNAA in the liquid crystal panel 11, the display is not interrupted, and therefore, the display quality is high.

The alignment mark 22 is formed by the hole edge of the polarizing plate penetration hole 19 that is provided penetrating the polarizing plate 12. The alignment mark 22 includes at least the linear indicator part 23 and the reference point part 24 such that the planar shape thereof tends to be complicated. Therefore, if the alignment mark 22 is formed by the hole edge of the penetration hole that is provided to penetrate the liquid crystal panel 11, it may be difficult to process the liquid crystal panel 11. In this regard, the polarizing plate penetration hole 19 is provided penetrating the polarizing plate 12 and by the hole edge thereof, the alignment mark 22 is formed. In this case, the polarizing plate penetration hole 19 and the alignment mark 22 can be provided by processing the polarizing plate 12 relatively easily, and thus, the producing cost can be reduced.

The liquid crystal panel 11 includes the panel penetration hole 14 penetrating the liquid crystal panel 11 and communicating with the polarizing plate penetration hole 19. The alignment mark 22 includes the panel penetration hole parallel part 26 extended along a part of the hole edge of the panel penetration hole 14. In this structure, when the polarizing plate 12 is disposed at the outer surface of the liquid crystal panel 11, the polarizing plate penetration hole 19 and the panel penetration hole 14 communicate with each other. Since the panel penetration hole parallel part 26 of the alignment mark 22 formed by the hole edge of the polarizing plate penetration hole 19 of the polarizing plate 12 is disposed extending along a part of the hole edge of the panel penetration hole 14 in the liquid crystal panel 11, the external appearance is excellent.

In the liquid crystal panel 11, the panel penetration hole 14 and the center-side non-display area CNAA are similar in planar shape. Thus, the external appearance when the image is displayed in the display area AA is excellent.

The backlight device (lighting device) 13 that delivers light for display to the liquid crystal panel 11 is provided. The liquid crystal panel 11 includes the panel penetration hole 14 penetrating the liquid crystal panel 11 and communicating with the polarizing plate penetration hole 19. The backlight device 13 includes the backlight penetration hole (lighting device penetration hole) 18 penetrating the backlight device 13 and communicating with the panel penetration hole 14 of the liquid crystal panel 11. Thus, when the backlight device 13 and the liquid crystal panel 11 to which the polarizing plate 12 is disposed are assembled together, the polarizing plate penetration hole 19 of the polarizing plate 12, the panel penetration hole 14 of the liquid crystal panel 11, and the backlight penetration hole 18 of the backlight device 13 communicate with each other. Since the component can pass penetrating the polarizing plate penetration hole 19, the panel penetration hole 14, and the backlight penetration hole 18 that communicate with each other, this structure is preferable in varying the application of the liquid crystal display device 10.

In addition, the alignment mark 22 includes the perpendicular line parallel part (cross linear part) 25 that crosses with the linear indicator part 23, and the reference point part 24 is disposed at the intersection of the linear indicator part 23 and the perpendicular line parallel part 25. Thus, when the polarizing plate 12 is provided to the liquid crystal panel 11, the reference point part 24 at the intersection of the linear indicator part 23 and the perpendicular line parallel part 25 can be extracted easily through the analysis of the image resulting from the imaging of the alignment mark 22 with the imaging device, for example. Thus, the polarizing plate 12 and the liquid crystal panel 11 can be aligned more easily.

Second Embodiment

A second embodiment of the present invention is described with reference to FIG. 10 or FIG. 11. In this second embodiment, the planar shape of a polarizing plate penetration hole 119 and an alignment mark 122 is changed. The structure, operation, and effect of the second embodiment that are similar to those of the first embodiment described above are not described.

Figure 10:
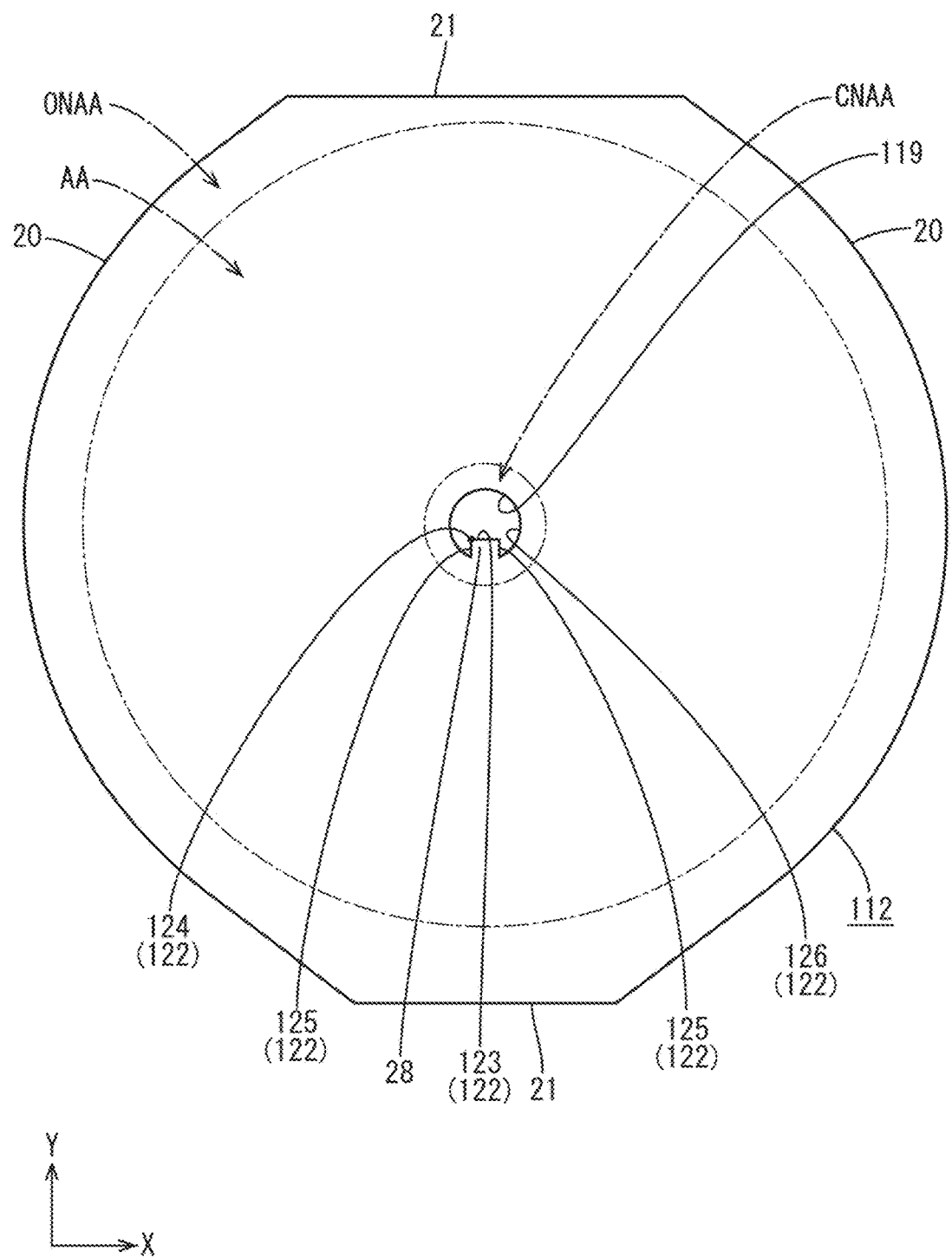
FIG. 10 is a plan view of a polarizing plate according to a second embodiment of the present invention.
Figure 11:
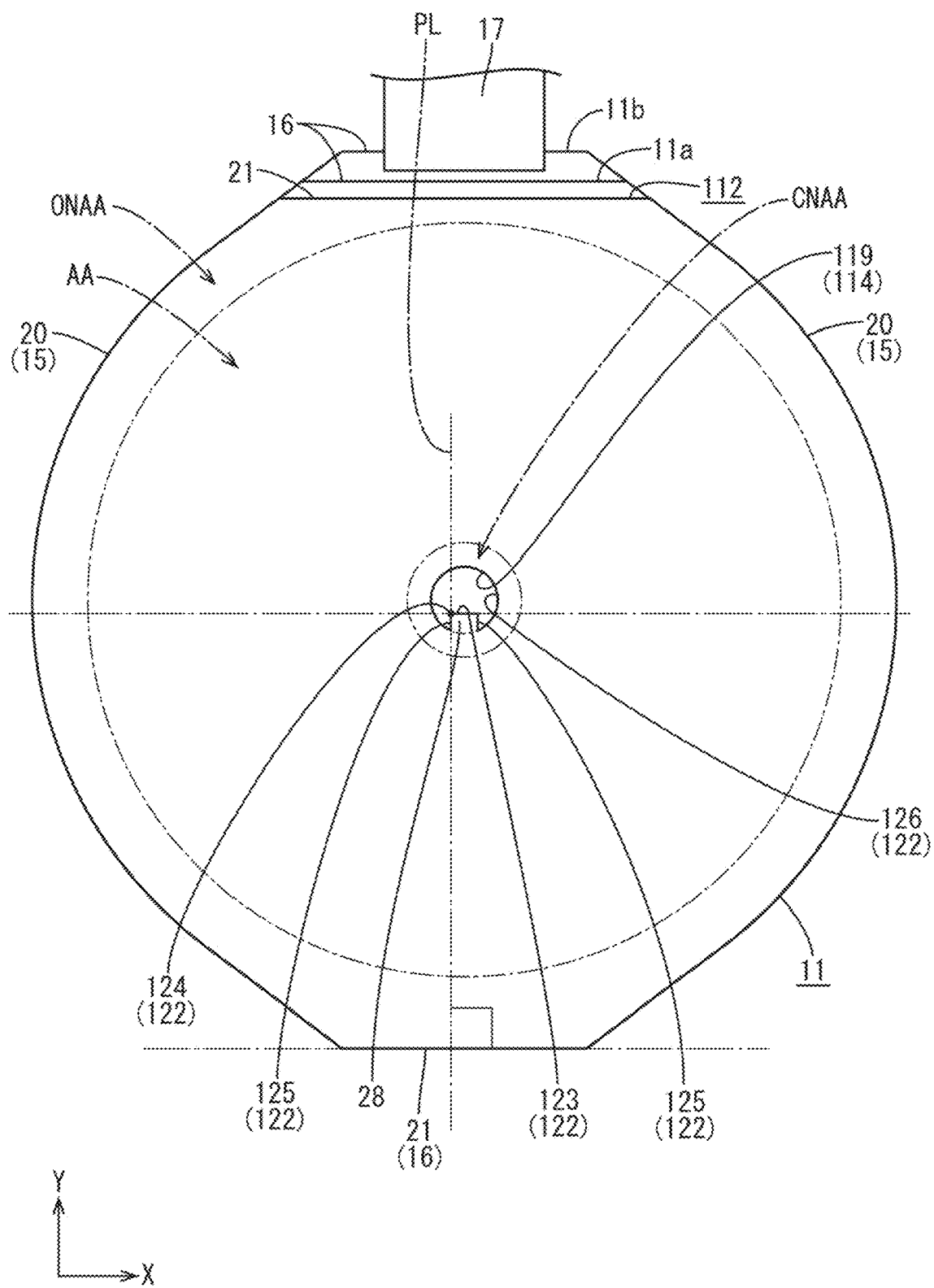
FIG. 11 is a plan view of a liquid crystal panel to which the polarizing plate is attached.

A polarizing plate 112 according to the present embodiment includes the polarizing plate penetration hole 119 that has its opening range narrower than the opening range of a panel penetration hole 114 as illustrated in FIG. 10 and FIG. 11. Specifically, the most part of a hole edge of the polarizing plate penetration hole 119 is parallel to a hole edge of the panel penetration hole 114 and a part of the hole edge of the polarizing plate penetration hole 119 is disposed on the inside relative to the hole edge of the panel penetration hole 114. In other words, the hole edge of the polarizing plate penetration hole 119 includes a projecting piece 28 that projects into the panel penetration hole 114. The projecting piece 28 is rectangular in a plan view and has its peripheral edge intersecting with the hole edge of the panel penetration hole 114.

The alignment mark 122 according to the present embodiment includes a linear indicator part 123 that is formed of a part of the peripheral edge of the projecting piece 28 in parallel to the X-axis direction, and on the other hand, a pair of perpendicular line parallel parts 125 is formed by a pair of parts of the peripheral edge of the projecting piece 28 is parallel to the Y-axis direction (an extending direction of the perpendicular bisector PL with respect to the linear indicator part 123). A panel penetration hole parallel part 126 in the alignment mark 122 is formed by the most part of the hole edge of the polarizing plate penetration hole 119 excluding the projecting piece 28 (part whose central angle is over 270°). A reference point part 124 in the alignment mark 122 is disposed at an intersection of a left end part of the linear indicator part 123 in FIG. 11 and an end part of the left perpendicular line parallel part 125 in FIG. 11 on the linear indicator part 123 side. Such a structure can also provide the operation and effect similar to those of the first embodiment.

Third Embodiment

A third embodiment of the present invention is described with reference to FIG. 12 or FIG. 13. In this third embodiment, the planar shape of a polarizing plate penetration hole 219 and an alignment mark 222 is different from that of the first embodiment. The structure, operation, and effect of the third embodiment that are similar to those of the first embodiment described above are not described.

Figure 12:
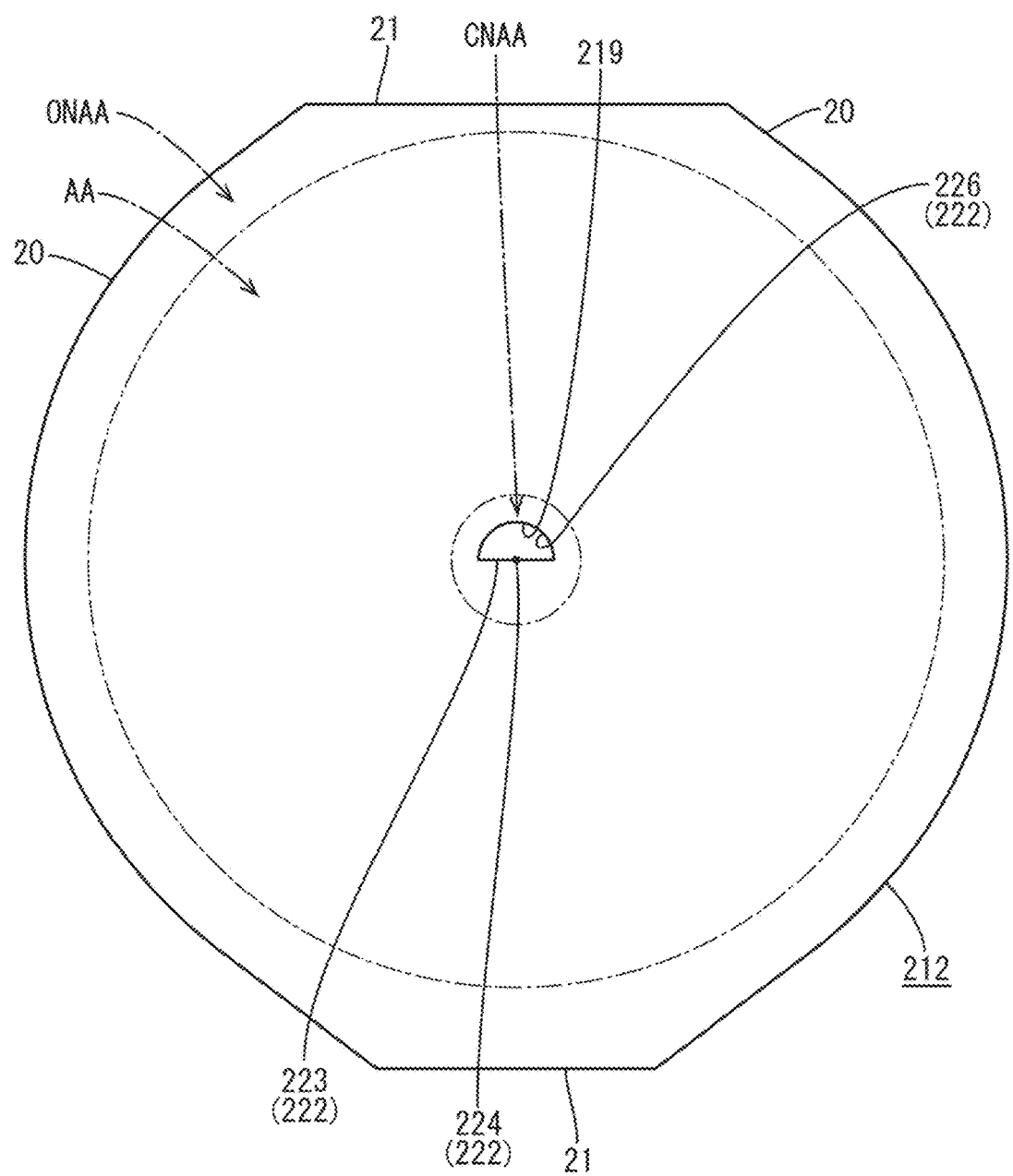
FIG. 12 is a plan view of a polarizing plate according to a third embodiment of the present invention.
Figure 13:
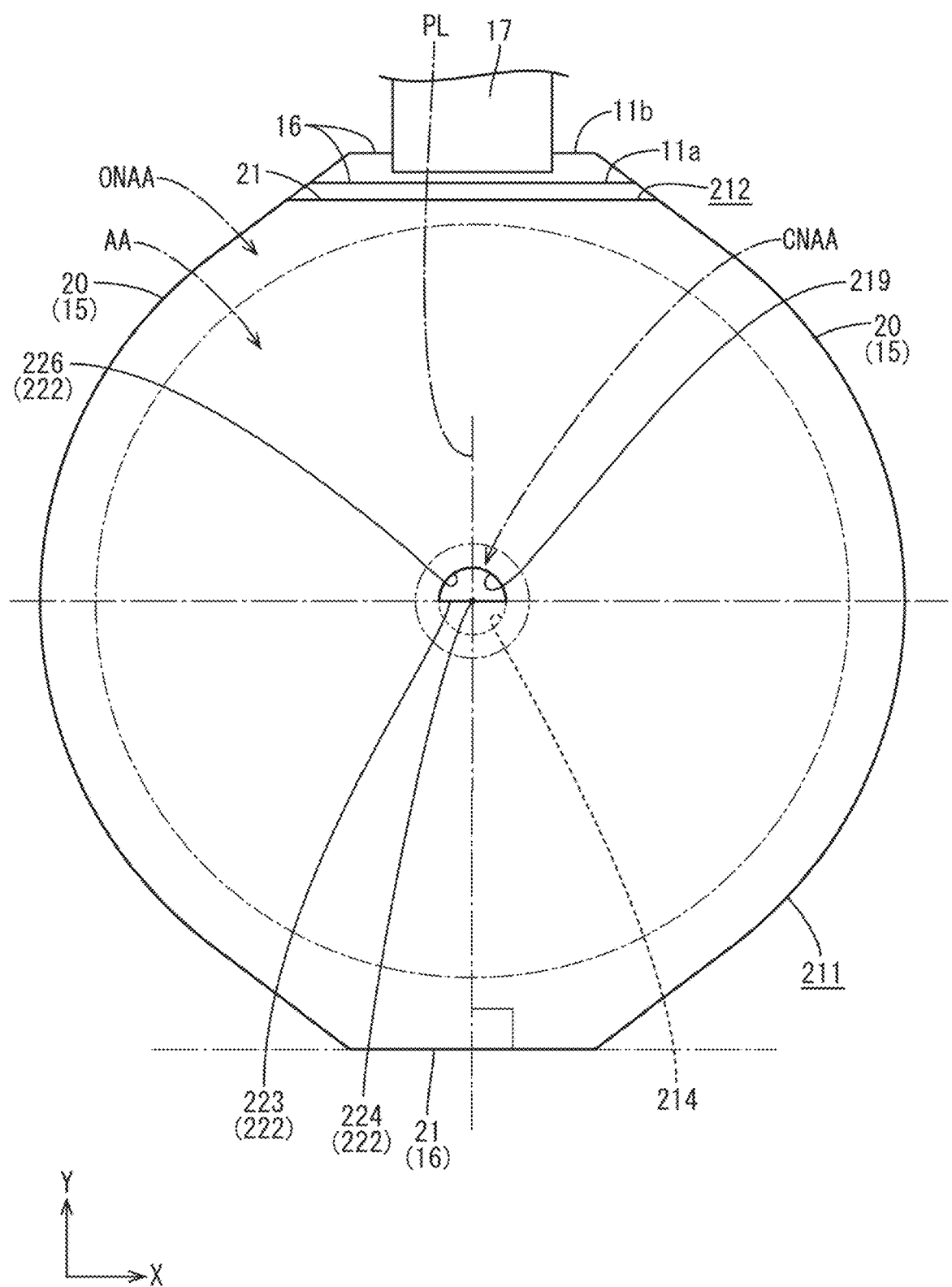
FIG. 13 is a plan view of a liquid crystal panel to which the polarizing plate is attached.

A polarizing plate 212 according to the present embodiment includes a polarizing plate penetration hole 219 whose planar shape is semi-circular, and an opening range thereof is narrower than that of a panel penetration hole 214 as illustrated in FIG. 12 and FIG. 13. Specifically, an arc-like part of a hole edge of the polarizing plate penetration hole 219 overlaps with about a half of a hole edge of the panel penetration hole 214; on the other hand, a linear part of the hole edge extends along the X-axis direction passing the center of the panel penetration hole 214 to cross the panel penetration hole 214.

In the alignment mark 222 according to the present embodiment, a linear indicator part 223 includes a linear part extended along the X-axis direction in the hole edge of the polarizing plate penetration hole 219, and a panel penetration hole parallel part 226 includes an arc-like part of the hole edge of the polarizing plate penetration hole 219. Therefore, this alignment mark 222 does not include the perpendicular line parallel part described in the first and second embodiments. A reference point part 224 in the alignment mark 222 is disposed with an equal distance from both ends of the linear indicator part 223. That is to say, the reference point part 224 is a middle point of the linear indicator part 223. In such a structure, when the polarizing plate 212 is attached to a liquid crystal panel 211, for example, the reference point part 224 at the equal distance from both ends of the linear indicator part 223 is extracted through the analysis of an image resulting from imaging of the alignment mark 222 with the imaging device, and on the basis of a positional relation between the reference point part 224 and the perpendicular bisector PL to the linear indicator part 223, the polarizing plate 212 and the liquid crystal panel 211 can be aligned.

As described above, according to the present embodiment, the reference point part 224 of the alignment mark 222 is disposed at the equal distance from both ends of the linear indicator part 223. Thus, when the polarizing plate 212 is provided to the liquid crystal panel 211, the reference point part 224 at the equal distance from both ends of the linear indicator part 223 is extracted through the analysis of an image resulting from the imaging of the alignment mark 222 with the imaging device, and on the basis of the reference point part 224, the polarizing plate 212 and the liquid crystal panel 211 can be aligned.

Fourth Embodiment

A fourth embodiment of the present invention is described with reference to FIG. 14 or FIG. 15. In this fourth embodiment, the planar shape of a polarizing plate penetration hole 319 and an alignment mark 322 is different from that of the third embodiment. The structure, operation, and effect of the fourth embodiment that are similar to those of the third embodiment described above are not described.

Figure 14:
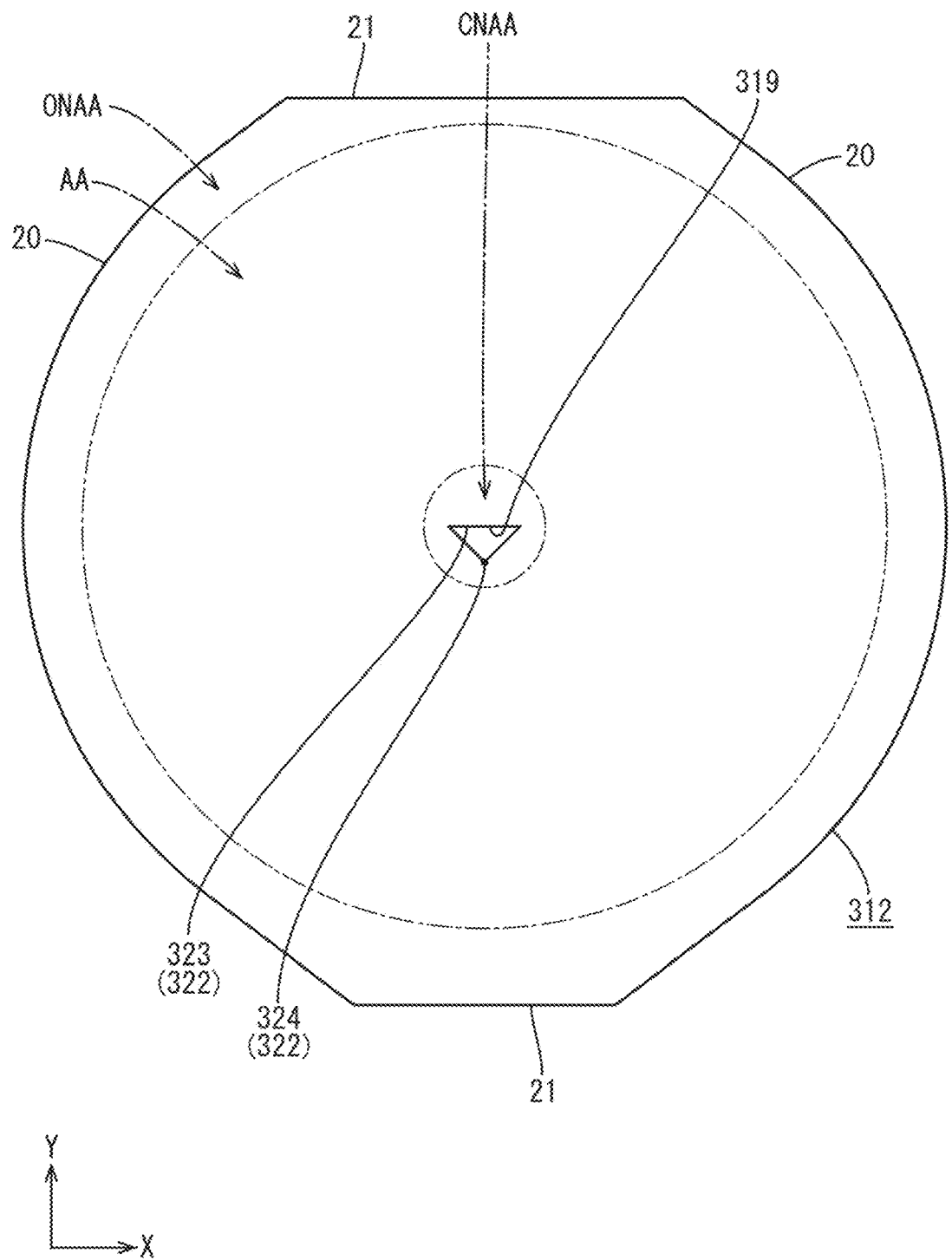
FIG. 14 is a plan view of a polarizing plate according to a fourth embodiment of the present invention.
Figure 15:
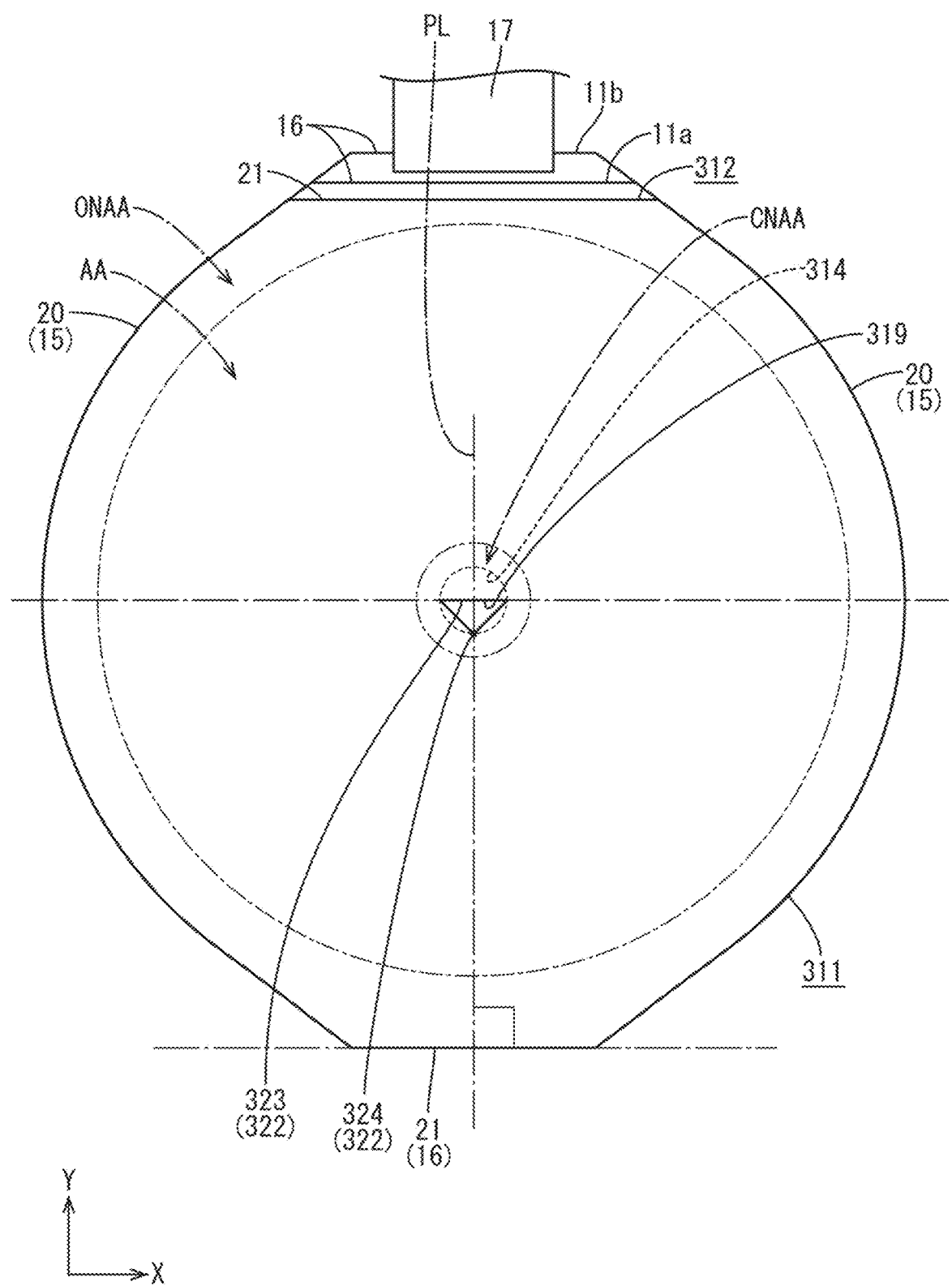
FIG. 15 is a plan view of a liquid crystal panel to which the polarizing plate is attached.

A polarizing plate 312 according to the present embodiment includes a polarizing plate penetration hole 319 whose planar shape is a triangle, and an opening range thereof is narrower than that of a panel penetration hole 314 as illustrated in FIG. 14 and FIG. 15. Specifically, the polarizing plate penetration hole 319 is an isosceles triangle in a plan view, and a hole edge part thereof corresponding to its base extends along the X-axis direction passing the center of the panel penetration hole 314 to cross the panel penetration hole 314. Of the hole edge of the polarizing plate penetration hole 319, a pair of hole edge parts to serve as a pair of isosceles extends along directions oblique to the X-axis direction and the Y-axis direction, and intersects with each other at an opposite vertex of the base.

In the alignment mark 322 according to the present embodiment, a linear indicator part 323 includes a hole edge part (base) extended along the X-axis direction in the hole edge of the polarizing plate penetration hole 319. Then, a reference point part 324 in the alignment mark 322 is disposed at an opposite vertex of the linear indicator part 323. That is to say, the reference point part 324 is disposed at an intersection of a pair of hole edge parts (isosceles) extended along the oblique direction in the hole edge of the alignment mark 322. By such a structure, when the polarizing plate 312 is attached to a liquid crystal panel 311, the reference point part 324 at the opposite vertex of the linear indicator part 323 can be extracted through the analysis of the image resulting from the imaging of the alignment mark 322 with the imaging device, for example. In this manner, according to the present embodiment, it is unnecessary to extract the reference point part 224 at the equal distance from both ends of the linear indicator part 223 as described in the third embodiment. Therefore, the reference point part 324 can be obtained relatively easily, and accordingly, the polarizing plate 312 and the liquid crystal panel 311 can be aligned more easily on the basis of the positional relation between the reference point part 324 and the perpendicular bisector PL to the linear indicator part 323. Note that the alignment mark 322 according to the present embodiment includes the panel penetration hole parallel part described in the third embodiment.

According to the present embodiment described above, the planar shape of the alignment mark 322 is the isosceles triangle whose base is the linear indicator part 323, and the reference point part 324 is disposed at the opposite vertex of the linear indicator part 323. Thus, when the polarizing plate 312 is provided to the liquid crystal panel 311, for example, the reference point part 324 at the opposite vertex of the linear indicator part 323 can be easily extracted through the analysis of the image resulting from the imaging of the alignment mark 322 with the imaging device. Thus, the polarizing plate 312 and the liquid crystal panel 311 can be aligned more easily.

Fifth Embodiment

A fifth embodiment of the present invention is described with reference to FIG. 16 or FIG. 17. The fifth embodiment is different from the first embodiment in that an alignment mark 422 is provided on a liquid crystal panel 411 side. The structure, operation, and effect of the fifth embodiment that are similar to those of the first embodiment described above are not described.

Figure 16:
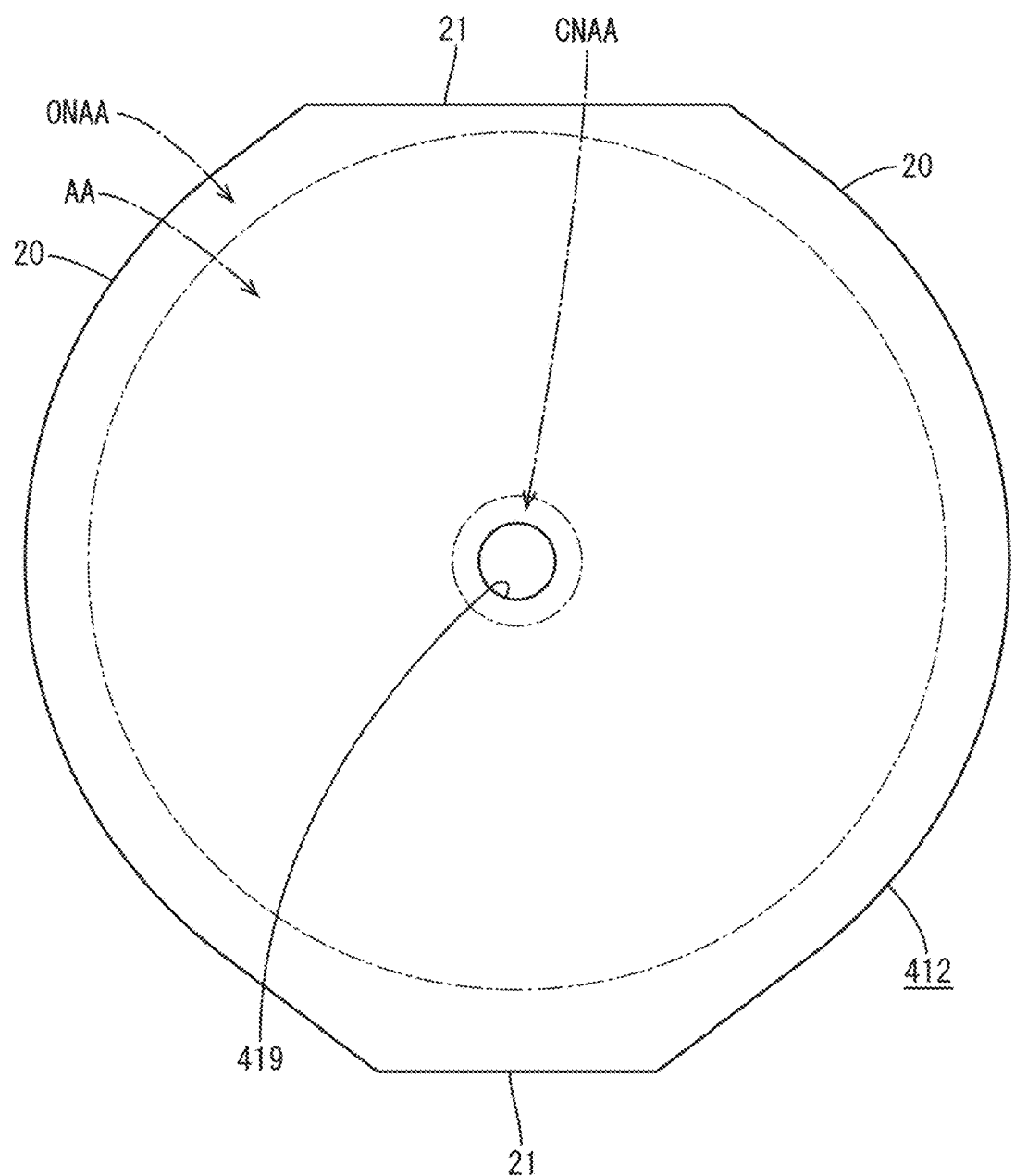
FIG. 16 is a plan view of a polarizing plate according to a fifth embodiment of the present invention.
Figure 17:
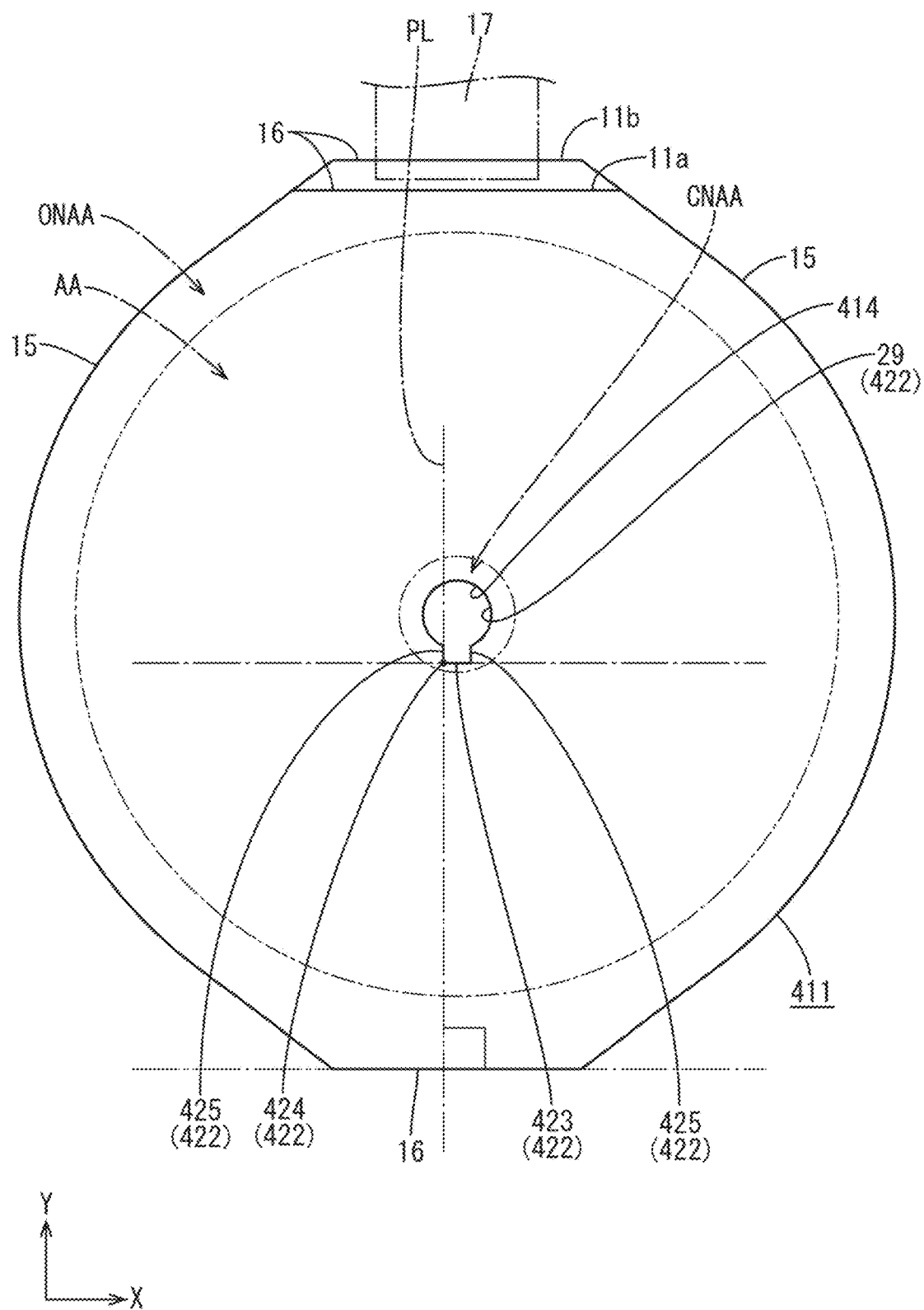
FIG. 17 is a plan view of a liquid crystal panel before the polarizing plate is attached.

A polarizing plate 412 according to the present embodiment includes a polarizing plate penetration hole 419 whose planar shape is circular as illustrated in FIG. 16. On the other hand, in the liquid crystal panel 411, a panel penetration hole 414 has an opening range that is larger than that of the polarizing plate penetration hole 419 as illustrated in FIG. 17, and by its hole edge, the alignment mark 422 is formed. Specifically, the most part of the panel penetration hole 414 is parallel to the polarizing plate penetration hole 419 and a part of the panel penetration hole 414 is expanded outward with respect to the polarizing plate penetration hole 419. An expansion part thereof is rectangular in a plan view. In the alignment mark 422, a linear indicator part 423 includes a part of the expansion part of the panel penetration hole 414 in parallel to the X-axis direction, and a pair of perpendicular line parallel parts 425 includes a part of the expansion part of the panel penetration hole 414 in parallel to the Y-axis direction. In addition, the alignment mark 422 includes a polarizing plate penetration hole parallel part 29 that is parallel to a hole edge of the polarizing plate penetration hole 419. A reference point part 424 in the alignment mark 422 is disposed at an intersection of a left end part of the linear indicator part 423 in FIG. 17 and an end part of the left perpendicular line parallel part 425 in FIG. 17 on the linear indicator part 423 side. Such a structure can also provide the operation and effect similar to those of the first embodiment.

Sixth Embodiment

A sixth embodiment of the present invention is described with reference to FIG. 18 or FIG. 19. In this sixth embodiment, the planar shape of a polarizing plate penetration hole 519 and an alignment mark 522 is different from that of the first embodiment described above. The structure, operation, and effect of the sixth embodiment that are similar to those of the first embodiment described above are not described.

Figure 18:
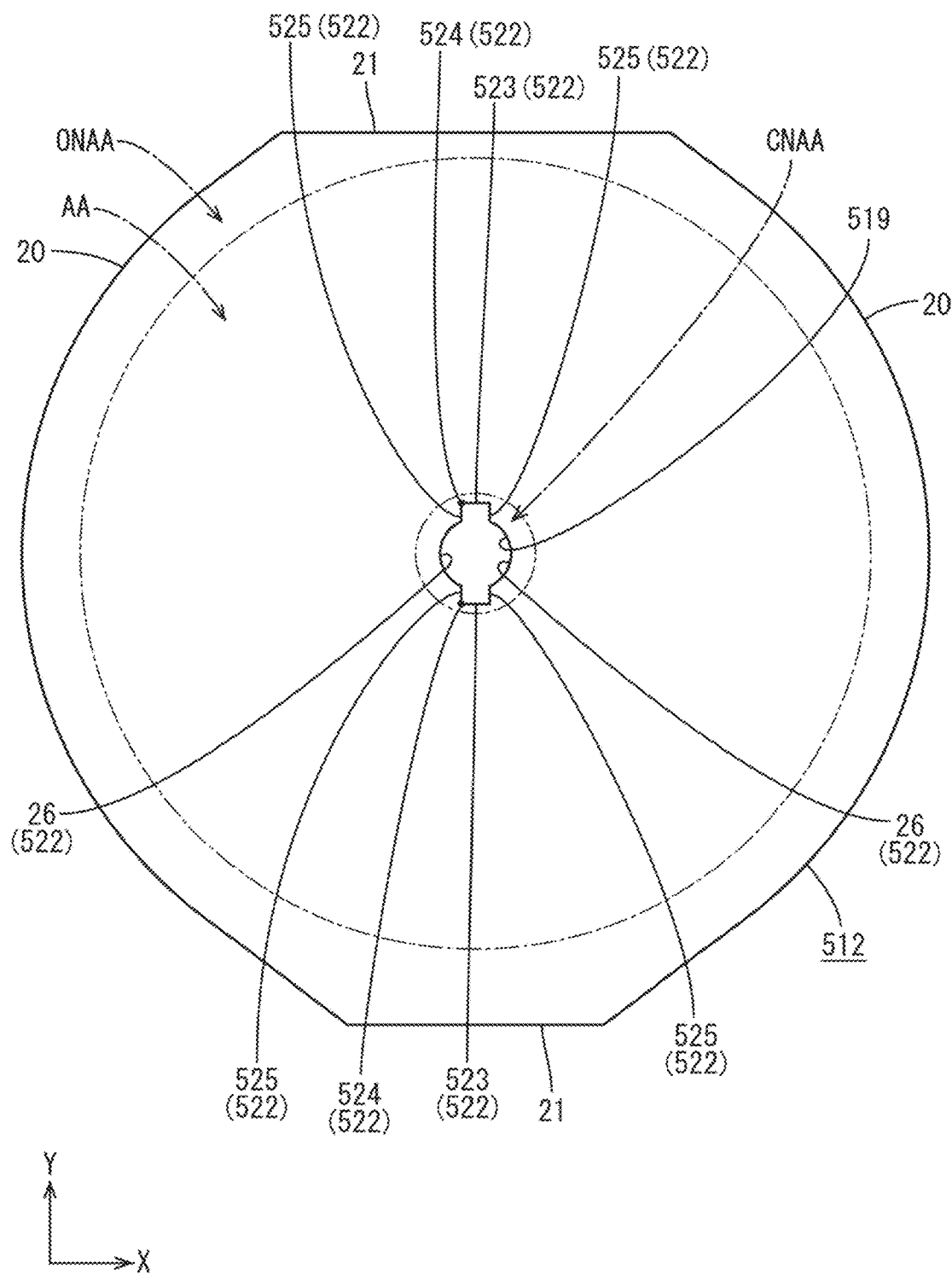
FIG. 18 is a plan view of a polarizing plate according to a sixth embodiment of the present invention.
Figure 19:
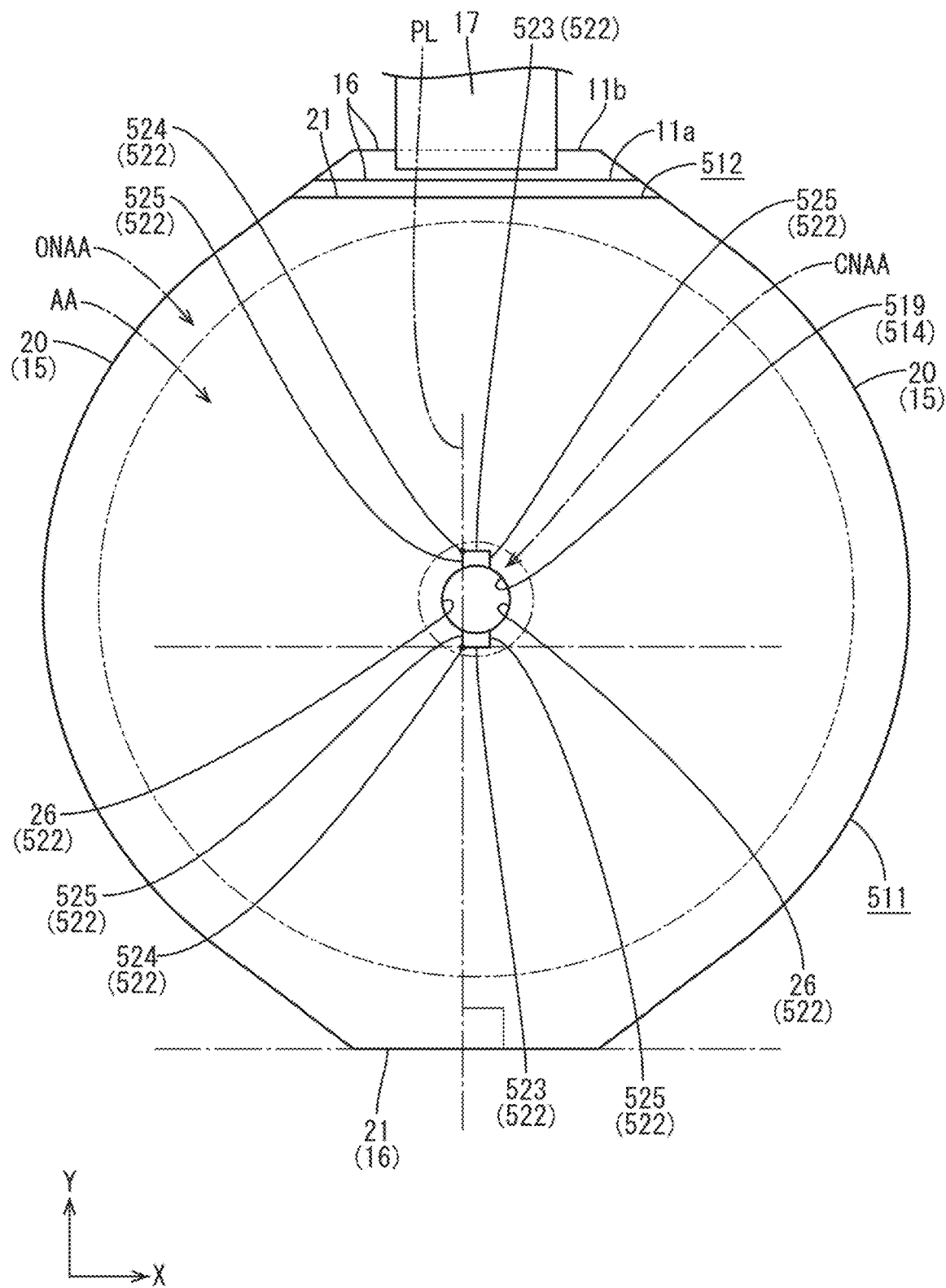
FIG. 19 is a plan view of a liquid crystal panel to which the polarizing plate is attached.

A polarizing plate penetration hole 519 of a polarizing plate 512 according to the present embodiment has its opening range larger than the opening range of a panel penetration hole 514 as illustrated in FIG. 18 and FIG. 19, and its expansion parts are provided as a pair. This pair of expansion parts each has a rectangular planar shape, and is disposed with an angle space of 180° along the Y-axis direction. Therefore, the alignment mark 522 includes two linear indicator parts 523 and two reference point parts 524, and four perpendicular line parallel parts 525 for the expansion parts. Note that when the polarizing plate 512 is attached to the liquid crystal panel 511, the liquid crystal panel 511 and the polarizing plate 512 can be aligned by overlapping the two reference point parts 524 and the perpendicular bisector PL to the linear indicator part 523, for example.

Seventh Embodiment

A seventh embodiment of the present invention is described with reference to FIG. 20 or FIG. 21. In this seventh embodiment, the planar shape of a polarizing plate penetration hole 619 and an alignment mark 622 is different from that of the sixth embodiment described above. The structure, operation, and effect of the seventh embodiment that are similar to those of the sixth embodiment described above are not described.

Figure 20:
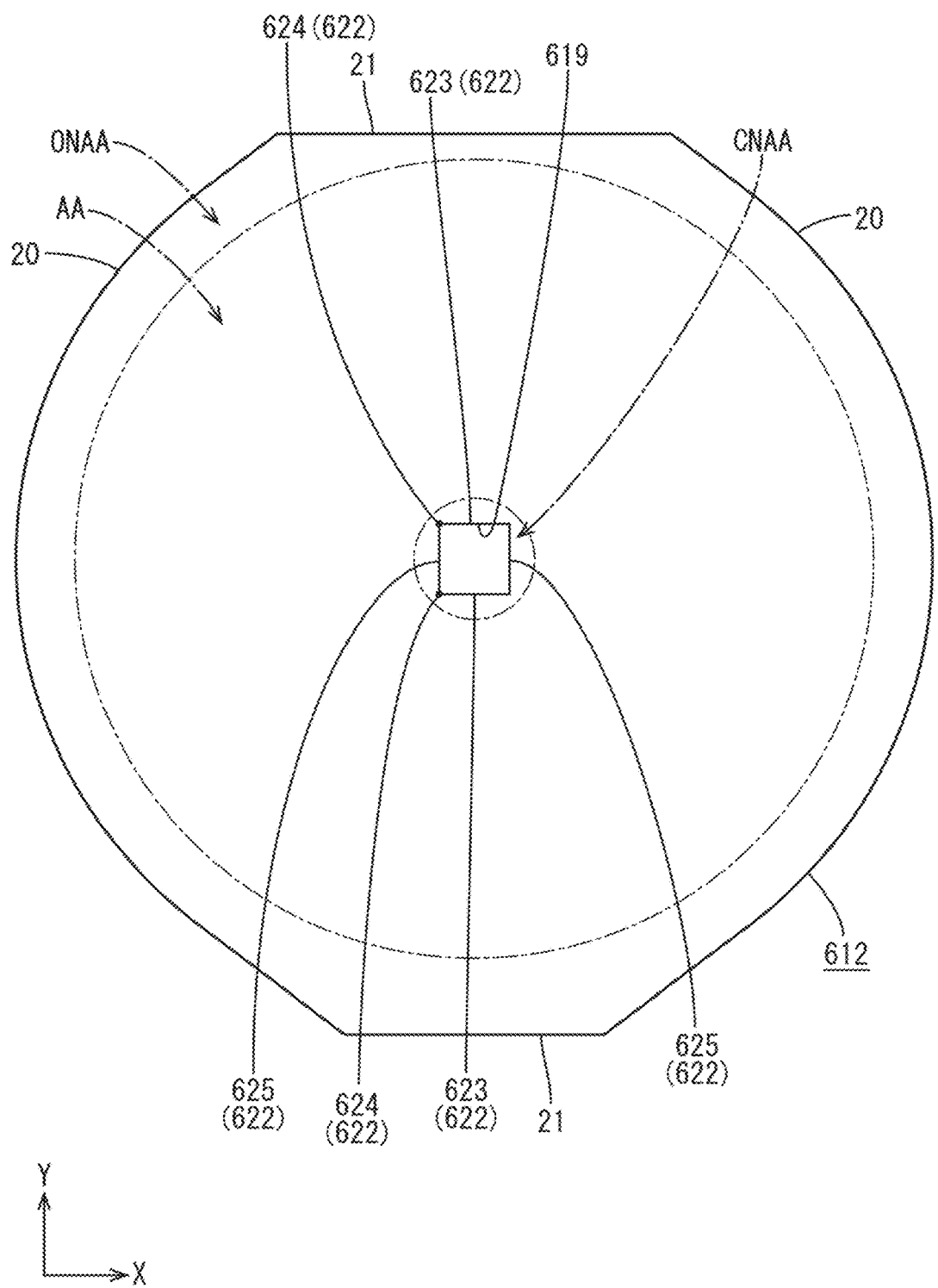
FIG. 20 is a plan view of a polarizing plate according to a seventh embodiment of the present invention.
Figure 21:
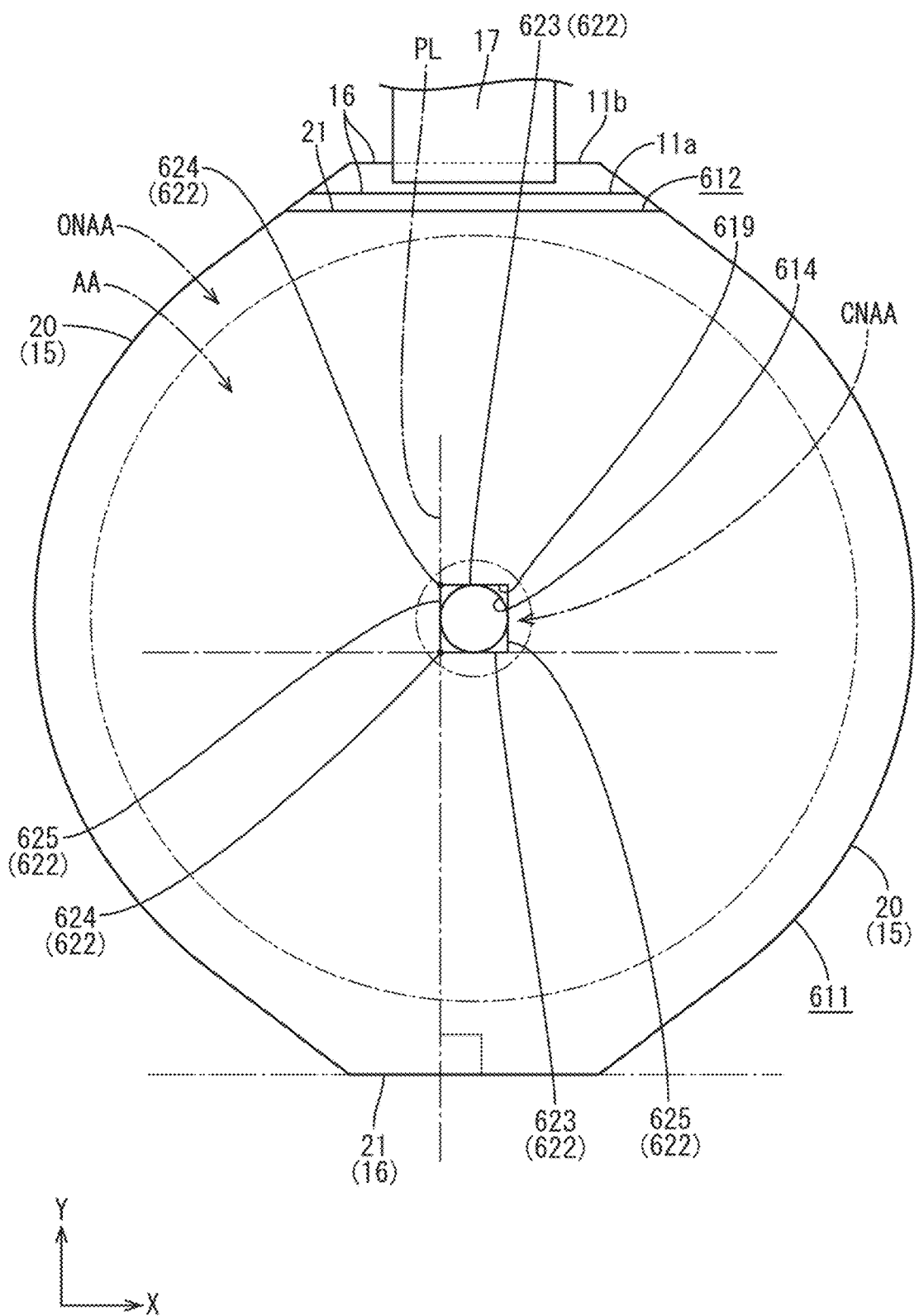
FIG. 21 is a plan view of a liquid crystal panel to which the polarizing plate is attached.

A polarizing plate penetration hole 619 of a polarizing plate 612 according to the present embodiment has a rectangular planar shape and has its opening range larger than the opening range of a panel penetration hole 614 as illustrated in FIG. 20 and FIG. 21. Specifically, the polarizing plate penetration hole 619 has a square shape in a plan view, and a pair of sides thereof is parallel to the X-axis direction and the other pair of sides is parallel to the Y-axis direction. The alignment mark 622 according to the present embodiment includes a pair of linear indicator parts 623 including a pair of hole edge parts extended along the X-axis direction in a hole edge of the polarizing plate penetration hole 619, and a pair of perpendicular line parallel parts 625 including a pair of hole edge parts extended along the Y-axis direction in the hole edge of the polarizing plate penetration hole 619. A pair of reference point parts 624 of the alignment mark 622 is disposed at an intersection of the pair of linear indicator parts 623 and the left perpendicular line parallel part 625 in FIG. 21. By such a structure, the polarizing plate 612 can be aligned with the liquid crystal panel 611 in a manner similar to the sixth embodiment.

Eighth Embodiment

An eighth embodiment of the present invention is described with reference to FIG. 22. In this eighth embodiment, the planar shape of a liquid crystal panel 711 and a polarizing plate 712 is different from that of the first embodiment described above. The structure, operation, and effect of the eighth embodiment that are similar to those of the first embodiment described above are not described.

Figure 22:
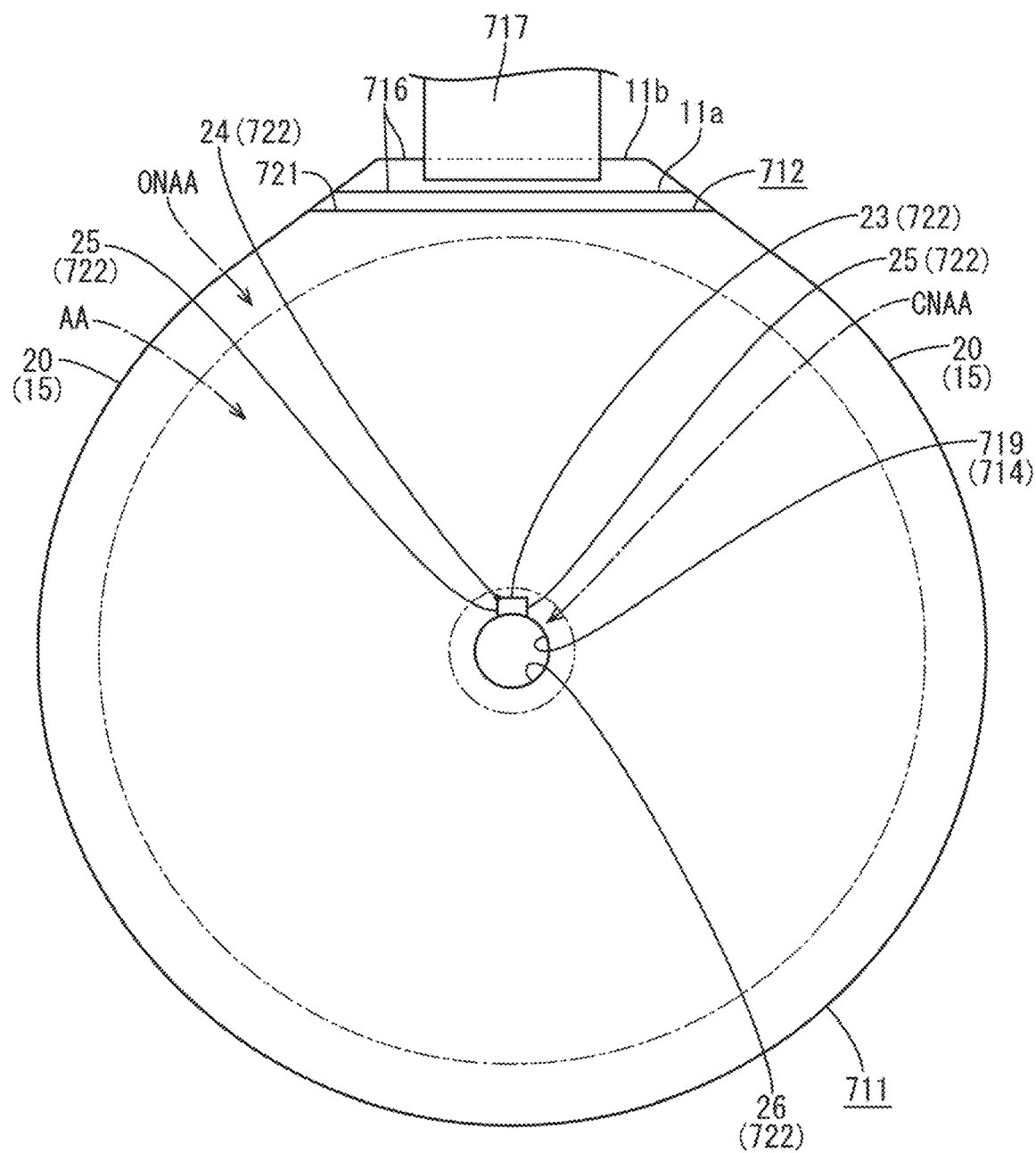
FIG. 22 is a plan view of a liquid crystal panel to which a polarizing plate according to an eighth embodiment of the present invention is attached.

Each of the liquid crystal panel 711 and the polarizing plate 712 according to the present embodiment includes a panel-side linear outer shape part 716 and a polarizing plate-side linear outer shape part 721 as illustrated in FIG. 22. Specifically, the panel-side linear outer shape part 716 is provided selectively in a part of an outer peripheral end part of the liquid crystal panel 711 to which a flexible substrate 717 is mounted in a circumferential direction. The polarizing plate-side linear outer shape part 721 is provided selectively in a part of an outer peripheral end part of the polarizing plate 712 that overlaps with the panel-side linear outer shape part 716 and the flexible substrate 717 in the circumferential direction, and is parallel to the panel-side linear outer shape part 716. Along with this, a polarizing plate penetration hole 719 has an opening range expanded toward the panel-side linear outer shape part 716 and the polarizing plate-side linear outer shape part 721 in the Y-axis direction with respect to a panel penetration hole 714, and by a hole edge of this expansion part, an alignment mark 722 is formed. Such a structure can also provide the operation and effect similar to those of the first embodiment described above.

Ninth Embodiment

A ninth embodiment of the present invention is described with reference to FIG. 23. In this ninth embodiment, the mount state of a driver 30 is different from that of the first embodiment described above. The structure, operation, and effect of the ninth embodiment that are similar to those of the sixth embodiment described above are not described.

Figure 23:
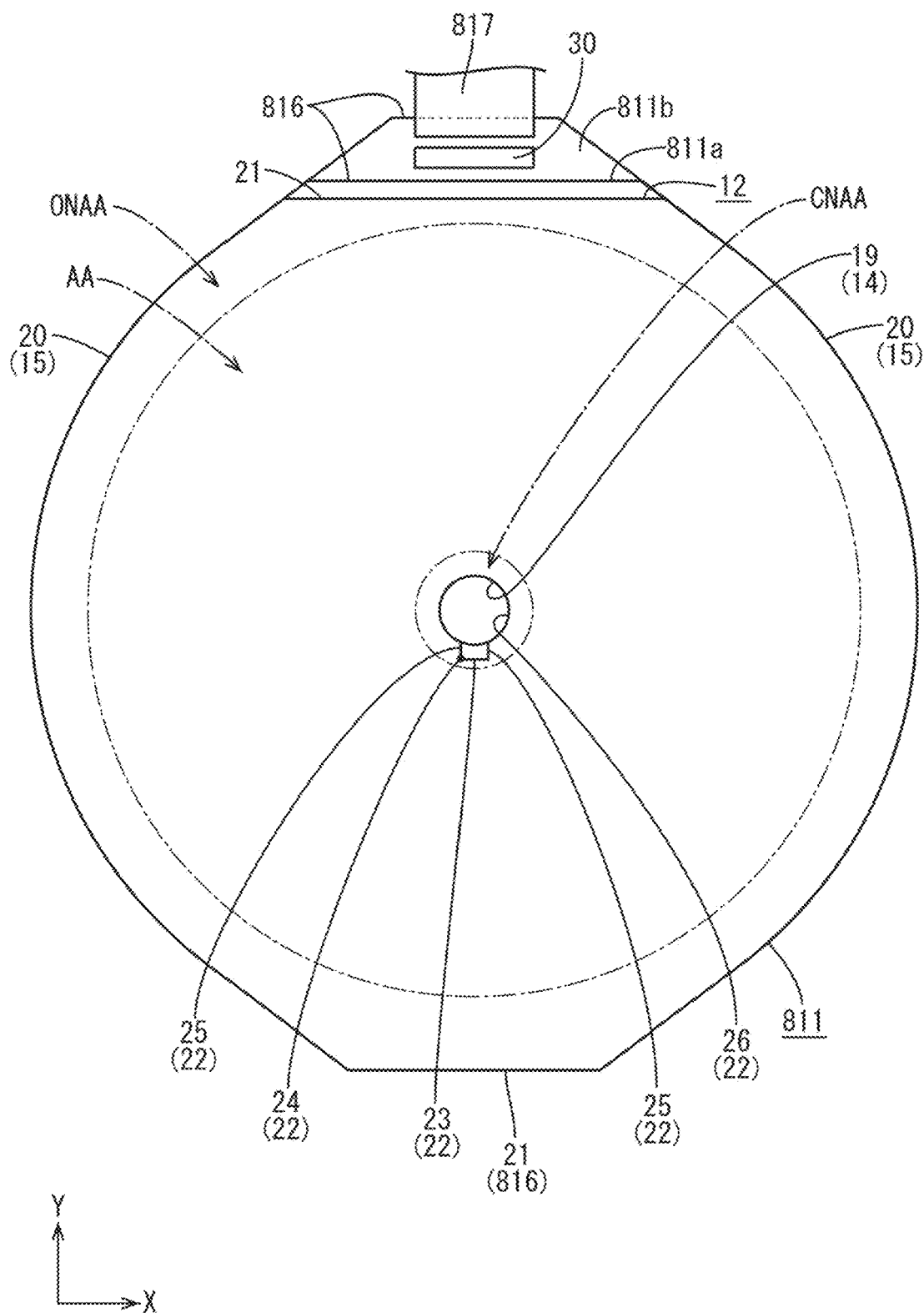
FIG. 23 is a plan view of a liquid crystal panel to which a polarizing plate according to a ninth embodiment of the present invention is attached.

The driver 30 according to the present embodiment is mounted by COG (Chip On Glass) directly to a liquid crystal panel 811 as illustrated in FIG. 23. The driver 30 is mounted in a part of an array substrate 811b of the liquid crystal panel 811 that protrudes with respect to a panel-side linear outer shape part 816 of a CF substrate 811a, and is disposed next to a flexible substrate 817. The driver 30 has a horizontally long rectangular shape, and its long-side direction is parallel to the panel-side linear outer shape part 816. Such a structure can also provide the operation and effect similar to those of the first embodiment described above.

OTHER EMBODIMENTS

The present invention is not limited to the embodiments described above with reference to the drawings, and the following embodiments are also included in the technical range of the present invention, for example.

(1) In the first, second, fifth, and sixth embodiments, the reference point part of the alignment mark is disposed at the end part of the linear indicator part; however, the reference point part may be disposed at a position (including middle point) other than both ends of the linear indicator part in the alignment mark whose planar shape is similar to that described in the first, second, fifth, and sixth embodiments.

(2) In the third, fourth, and seventh embodiments, the reference point part of the alignment mark is disposed at the middle point of the linear indicator part; however, the reference point part may be disposed at a position (including end part) other than the middle point of the linear indicator part in the alignment mark whose planar shape is similar to that described in the third, fourth, and seventh embodiments.

(3) In the first and seventh embodiments, the opening range of the polarizing plate penetration hole is larger than the opening range of the panel penetration hole; however, the opening range of the polarizing plate penetration hole whose planar shape is similar to that described in the first and seventh embodiments may be narrower than the opening range of the panel penetration hole.

(4) In the second to sixth embodiments, the opening range of the polarizing plate penetration hole is narrower than the opening range of the panel penetration hole; however, the opening range of the polarizing plate penetration hole whose planar shape is similar to that described in the second to sixth embodiments may be larger than the opening range of the panel penetration hole.

(5) In each of the above embodiments described above (except the fifth embodiment), the planar shape of the panel penetration hole is circular; however, the planar shape of the panel penetration hole can be changed otherwise as appropriate. Specifically, the planar shape of the panel penetration hole may be triangular, rectangular, trapezoidal, rhombic, elliptical, semicircular, or the like.

(6) In each of the above embodiments, the alignment mark is provided to at least one of the liquid crystal panel and the polarizing plate; however, the alignment mark may be provided to both the liquid crystal panel and the polarizing plate.

(7) In each of the above embodiments, the polarizing plate is aligned using the panel-side linear outer shape part, which is one of the pair of panel-side linear outer shape parts forming the outer shape of the liquid crystal panel that is on the side opposite to the flexible substrate side; however, the polarizing plate can alternatively be aligned using the panel-side linear outer shape part, which is the other of the panel-side linear outer shape parts that is on the flexible substrate side. In this case, the panel-side linear outer shape part on the side opposite to the flexible substrate side can be omitted.

(8) In each of the above embodiments, the linear outer shape part is provided to both the liquid crystal panel and the polarizing plate; however, the linear outer shape part may be provided selectively only to one of the liquid crystal panel and the polarizing plate that is on the side where the alignment mark is not provided. Note that in the case where the alignment mark is provided to both the liquid crystal panel and the polarizing plate, the linear outer shape part can be provided selectively only to one of the liquid crystal panel and the polarizing plate.

(9) In each of the above embodiments, the curved outer shape part is provided to both the liquid crystal panel and the polarizing plate; however, the curved outer shape part may be provided selectively only to one of the liquid crystal panel and the polarizing plate.

(10) In each of the above embodiments (except the fifth embodiment), the alignment mark is formed by the hole edge of the polarizing plate penetration hole provided to penetrate the polarizing plate; however, the alignment mark can alternatively be provided by, instead of using the polarizing plate penetration hole, coloring a part of the polarizing plate.

(11) In each of the above embodiments, the panel penetration hole of the liquid crystal panel and the center-side non-display area in the liquid crystal panel are similar in shape; however, the panel penetration hole and the center-side non-display area may not be similar in shape.

(12) In each of the above embodiments, the panel penetration hole is provided to the liquid crystal panel; however, the panel penetration hole can be omitted. In this case, it is preferable to provide a light-blocking component (such as a light-blocking layer of a CF substrate) in the center-side non-display area in the liquid crystal panel. Note that the inner peripheral side sealing part is also omitted from the liquid crystal panel that does not include the panel penetration hole.

(13) In each of the first and sixth embodiments, the planar shape of the expansion part in the polarizing plate penetration hole is rectangular; however, the planar shape of the expansion part can be changed into a trapezoidal shape, a triangular shape, or the like.

(14) In the second embodiment, the projecting piece that is provided to the hole edge of the polarizing plate penetration hole has the planar shape that is rectangular; however, the planar shape of the projecting piece can be changed into a trapezoidal shape, a triangular shape, or the like.

(15) In the third embodiment, the linear indicator part of the alignment mark is disposed overlapping with the center of the panel penetration hole; however, the linear indicator part may alternatively be disposed so as not to overlap (non-overlap) with the center of the panel penetration hole.

(16) In the fourth embodiment, the planar shape of the polarizing plate penetration hole is the isosceles triangle; however, the planar shape of the polarizing plate penetration hole may be, for example, an equilateral triangle or a triangle whose sides are different from each other.

(17) The structure according to the fifth embodiment (the structure in which the alignment mark is provided on the liquid crystal panel side) can be combined with the structure according to the second, fourth, sixth, or seventh embodiment.

(18) In the sixth embodiment, two expansion parts are provided to the polarizing plate penetration hole; however, three or more expansion parts can alternatively be provided to the polarizing plate penetration hole.

(19) In the seventh embodiment, the planar shape of the polarizing plate penetration hole is a square; however, the planar shape of the polarizing plate penetration hole can alternatively be, for example, a horizontally long rectangle or a vertically long rectangle. Further alternatively, the planar shape of the polarizing plate penetration hole may be trapezoidal, rhombic, or the like.

(20) The specific planar shape of the alignment mark can be changed as appropriate in a way other than those described in the above embodiments.

(21) In each of the above embodiments, the planar shape of the liquid crystal panel is approximately circular; however, the planar shape of the liquid crystal panel may be, for example, semicircular, approximately elliptical, or semielliptical.

(22) In each of the above embodiments, the liquid crystal panel of the horizontal electric field type is shown; however, the present invention is also applicable to the liquid crystal panel of the vertical electric field type.

(23) In each of the above embodiments, the orientation film is the optical orientation film; however, an optical film in which an orientation process is performed by rubbing may be employed alternatively.

(24) In each of the above embodiments, the liquid crystal panel is a normally-black mode liquid crystal panel in which a pair of polarizing plates is in the crossed Nichol arrangement; however, the present invention is also applicable to a normally-white liquid crystal panel in which a pair of polarizing plates is in a parallel Nichol arrangement.

(25) In each of the above embodiments, the array substrate includes a glass substrate made of glass; however, the present invention is also applicable to a structure in which the array substrate includes a substrate made of synthetic resin (for example, polyimide). In this case, the liquid crystal panel can be made flexible and thin, which is preferable.

(26) In each of the above embodiments, the liquid crystal display device of a transmission type including the backlight device as an external light source is shown; however, the present invention is also applicable to a reflective liquid crystal display device that performs display using external light. The present invention is also applicable to a transflective liquid crystal display device.

(27) In each of the above embodiments, the TFT is used as the switching element (driven element) in the liquid crystal display device; however, the present invention is also applicable to a liquid crystal display device including a switching element other than the TFT (for example, thin film diode (TFD)), and moreover to other liquid crystal display devices than a color-display liquid crystal display device, such as a monochromatic liquid crystal display device.

(28) In each of the above embodiments, the diameter dimension of the backlight penetration hole and the diameter dimension of the panel penetration hole are substantially the same such that their hole edges are flush; however, the diameter dimension of the backlight penetration hole and the diameter dimension of the panel penetration hole may be different and their hole edges may not be flush. Similarly, the panel penetration hole parallel part of the alignment mark may not be flush with the hole edge of the panel penetration hole.

(29) In each of the above embodiments, the liquid crystal panel is used as the display panel; however, the present invention is also applicable to an organic EL panel as the display panel, for example.

EXPLANATION OF SYMBOLS

10: Liquid crystal display device (Display device)
11, 211, 311, 411, 511, 611, 711, 811: Liquid crystal panel (Display panel)
12, 112, 212, 312, 412, 512, 612, 712: Polarizing plate
13: Backlight device (Lighting device)
14, 114, 214, 314, 414, 514, 614, 714: Panel penetration hole
15: Panel-side curved outer shape part (Curved outer shape part)
16, 716, 816: Panel-side linear outer shape part (Linear outer shape part)
18: Backlight penetration hole (Lighting device penetration hole)
19, 119, 219, 319, 419, 519, 619, 719: Polarizing plate penetration hole
20: Polarizing plate-side curved outer shape part (Curved outer shape part)
21, 721: Polarizing plate-side linear outer shape part (Linear outer shape part)
22, 122, 222, 322, 422, 522, 622, 722: Alignment mark
23, 123, 223, 323, 423, 523, 623: Linear indicator part
24, 124, 224, 324, 424, 524, 624: Reference point part
25, 125, 425, 525, 625: Perpendicular line parallel part (Cross linear part)
26, 126, 226: Panel penetration hole parallel part

The invention claimed is:
1. A display device comprising:
a display panel including at least a display area where an image is displayed and a center non-display area at a center of the display area;
a polarizing plate on an outer surface of the display panel;

a curved outer shape portion included in at least a portion of an outer shape of one of the display panel and the polarizing plate and having a curved planar shape;
a linear outer shape portion included in at least a portion of the outer shape of the one of the display panel and the polarizing plate and having a linear planar shape; and
an alignment mark included in another one of the polarizing plate and the display panel and at a position overlapping the center non-display area, wherein the alignment mark includes:
  a linear indicator portion having a linear planar shape that is parallel to the linear outer shape portion of the one of the display panel and the polarizing plate, and
  a reference point included at an end of the linear planar shape of the linear indicator portion and being on a perpendicular bisector of the linear outer shape portion of the one of the display panel and the polarizing plate.

2. The display device according to claim 1, wherein the alignment mark is defined by a hole edge of a polarizing plate penetration hole that is through the polarizing plate.

3. The display device according to claim 2, wherein the display panel includes a panel penetration hole penetrating the display panel and communicating with the polarizing plate penetration hole, and
the alignment mark includes a panel penetration hole parallel portion extending along a portion of a hole edge of the panel penetration hole.

4. The display device according to claim 3, wherein, in the display panel, the panel penetration hole and the center non-display area are similar in planar shape.

5. The display device according to claim 2, further comprising a lighting device that supplies light for display to the display panel, wherein
the display panel includes the panel penetration hole penetrating the display panel and communicating with the polarizing plate penetration hole, and
the lighting device includes a lighting device penetration hole penetrating the lighting device and communicating with the panel penetration hole of the display panel.

6. The display device according to claim 1, wherein the alignment mark includes a cross linear portion crossing the linear indicator portion and includes the reference point part at an intersection of the linear indicator portion and the cross linear portion.

7. The display device according to claim 1, wherein the alignment mark includes the reference point at an equal distance from both ends of the linear indicator portion.

8. The display device according to claim 1, wherein
the alignment mark has a planar shape that is an isosceles triangle whose base is the linear indicator portion, and
the reference point is at an opposite vertex of the linear indicator portion.

9. A display device comprising:
a display panel including at least a display area where an image is displayed and a center non-display area at a center of the display area and including a panel through hole that is through the display panel;
a polarizing plate on an outer surface of the display panel and including a polarizing plate penetration hole that is through the polarizing plate and has a hole edge, the polarizing plate penetration hole including a main hole portion that communicates with the panel through hole and an extended portion that extends radially from the main hole portion;
a curved outer shape portion included in at least a portion of an outer shape of at least one of the display panel and the polarizing plate and having a curved planar shape;
a linear outer shape portion included in at least a portion of the outer shape of the display panel and having a linear planar shape; and
an alignment mark included in the polarizing plate and at a position overlapping the center non-display area, and the alignment mark being the hole edge of the extended portion, the hole edge of the extended portion including cross linear portions extending from ends of the hole edge of the main hole portion, a linear indicator portion having a linear planar shape that is parallel to the linear outer shape portion of the display panel and connects extended ends of the cross linear portions, and a reference point that is included in the linear indicator portion.

10. The display device according to claim 1, wherein
the display panel includes a panel penetration hole,
the polarizing plate includes a polarizing plate penetration hole including a main hole and an extended portion that extends radially from the main hole portion,
the alignment mark is a hole edge of the extended portion, and the hole edge of the extended portion includes cross linear portions extending from ends of the hole edge of the main hole portion, a linear indicator portion, and a reference point, and
the linear indicator portion connects extended ends of the cross linear portions.

11. The display device according to claim 1, wherein the polarizing plate includes two polarizing plates that sandwich the display panel therebetween and each of the polarizing plates includes the alignment mark.

12. The display device according to claim 1, wherein the extended portion includes two extended portions that are opposite each other.

13. The display device according to claim 1, wherein the curved outer shape portion and the linear outer shape portion are included in the display panel and the alignment mark is included in the polarizing plate.

14. The display device according to claim 9, wherein the reference point is included at an end of the linear planar shape of the linear indicator portion and is on a perpendicular bisector of the linear outer shape portion of the one of the display panel and the polarizing plate.

15. The display device according to claim 9, wherein the polarizing plate includes two polarizing plates that sandwich the display panel therebetween and each of the polarizing plates includes the alignment mark.

16. The display device according to claim 9, wherein the extended portion includes two extended portions that are opposite each other.

17. The display device according to claim 9, wherein the alignment mark includes a cross linear portion crossing the linear indicator portion and includes the reference point at an intersection of the linear indicator portion and the cross linear portion.

18. The display device according to claim 9, wherein the alignment mark includes the reference point at an equal distance from both ends of the linear indicator portion.

19. The display device according to claim 9, wherein
the alignment mark has a planar shape that is an isosceles triangle whose base is the linear indicator portion, and
the reference point is at an opposite vertex of the linear indicator portion.

* * * * *